US012095610B2

(12) United States Patent
Bhagwan et al.

(10) Patent No.: US 12,095,610 B2
(45) Date of Patent: Sep. 17, 2024

(54) OPTIMIZING NETWORK PROVISIONING THROUGH COOPERATION

(71) Applicant: MICROSOFT TECHNOLOGY LICENSING, LLC, Redmond, WA (US)

(72) Inventors: Ranjita Bhagwan, Bangalore (IN); Harsha Sharma, Bangalore (IN); Parth Dhaval Thakkar, Champaign, IL (US); Sagar Bharadwaj Kalasibail Seetharam, Pittsburgh, PA (US); Venkata N. Padmanabhan, Bangalore (IN); Kathleen Voelbel, Bellevue, WA (US); Vijay Rajeshkumar, Bothell, WA (US); Yogesh Bansal, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/674,716

(22) Filed: Feb. 17, 2022

(65) Prior Publication Data
US 2023/0261935 A1   Aug. 17, 2023

(51) Int. Cl.
H04L 41/0806   (2022.01)
H04L 41/069    (2022.01)
(Continued)

(52) U.S. Cl.
CPC ........ H04L 41/0806 (2013.01); H04L 41/069 (2013.01); H04L 41/145 (2013.01); H04L 41/147 (2013.01); H04L 45/02 (2013.01)

(58) Field of Classification Search
CPC ............... H04L 41/0806; H04L 41/069; H04L 41/145; H04L 41/147; H04L 45/02; H04L 43/0882; H04L 41/0896
See application file for complete search history.

(56) References Cited

U.S. PATENT DOCUMENTS 11,201,794 B1 * 12/2021 Guo ..................... H04L 43/0864
11,240,153 B1 *  2/2022 Vasseur ............... H04L 41/0883
(Continued)

FOREIGN PATENT DOCUMENTS

CN    112636995 A  *  4/2021  ........... H04L 41/147

OTHER PUBLICATIONS

"Amazon EC2 On-Demand Pricing", Retrieved From: https://aws.amazon.com/ec2/pricing/on-demand/#Data_Transfer., Mar. 10, 2021, 12 Pages.
(Continued)

Primary Examiner — Schquita D Goodwin
(74) Attorney, Agent, or Firm — Newport IP, LLC; Jacob P. Rohwer

(57) ABSTRACT

The techniques disclosed herein provision inter-DC WAN capacity based on network failure statistics and bandwidth demands of a cloud-hosted application. Network capacity is provisioned based on an assumption of runtime cooperation between the application and the network. For example, if the network detects that a link has failed, the application may cooperate with the network to pause a deferrable transfer, reserving bandwidth for non-deferrable transfers. With knowledge that deferrable transfers will be dynamically paused when a primary link fails, backup links may be provisioned with less capacity than the primary link. The ability to dynamically defer transfers also enables a greater degree of bandwidth smoothing, e.g. reducing peak demand by scheduling deferrable transfers for off-peak hours. This allows network links to be provisioned with less capacity than if all transfers were performed immediately.

19 Claims, 14 Drawing Sheets

(51) Int. Cl.
H04L 41/14 (2022.01)
H04L 41/147 (2022.01)
H04L 45/02 (2022.01)

(56) References Cited

U.S. PATENT DOCUMENTS

| | | | | |
|---|---|---|---|---|
| 11,252,029 | B1* | 2/2022 | Ahuja | H04L 47/83 |
| 2017/0270450 | A1* | 9/2017 | Binotto | H04L 43/0876 |
| 2018/0026850 | A1* | 1/2018 | Obregon | H04L 41/145 |
| | | | | 709/223 |
| 2019/0058638 | A1* | 2/2019 | Ahuja | H04L 43/0811 |
| 2019/0149428 | A1* | 5/2019 | Chung | H04L 45/302 |
| | | | | 370/351 |
| 2019/0236210 | A1* | 8/2019 | Makaremi | G06F 16/2471 |
| 2020/0401329 | A1* | 12/2020 | Watson | G06F 3/0614 |
| 2021/0144164 | A1* | 5/2021 | Mathur | H04L 67/10 |
| 2022/0124020 | A1* | 4/2022 | Hellmanns | H04L 45/38 |
| 2022/0132374 | A1* | 4/2022 | Cellarius | H04W 28/0226 |
| 2022/0303331 | A1* | 9/2022 | Svennebring | H04N 21/44209 |
| 2022/0369221 | A1* | 11/2022 | Pateromichelakis | |
| | | | | H04L 41/0806 |

OTHER PUBLICATIONS

"Azure bandwidth pricing", Retrieved From: https://azure.microsoft.com/en-us/pricing/details/bandwidth/., Mar. 10, 2021, 7 Pages.

"Zoom meetings", Retrieved From: https://explore.zoom.us/en/products/meetings/, Mar. 10, 2021, 5 Pages.

Chang, et al., "Robust Validation of Network Designs under Uncertain Demands and Failures", In Proceedings of 14th USENIX Symposium on Networked Systems Design and Implementation, Mar. 27, 2017, pp. 347-362.

Church, et al., "What are Microsoft teams live events", Retrieved From: https://docs.microsoft.com/en-us/microsoftteams/teams-live-events/what-are-teams-live-events, Oct. 29, 2021, 8 Pages.

Duffield, et al., "A Flexible Model for Resource Management in Virtual Private Networks", ACM SIG COMM Computer Communication Review, vol. 29, No. 4, Aug. 30, 1999, 14 Pages.

Everitt, et al., "Cluster analysis 5th ed", Retrieved From: https://www.wiley.com/en-us/Cluster+Analysis%2C+5th+Edition-p-9780470749913, Feb. 2011, 2 Pages.

Feldmann, et al., "Deriving Traffic Demands for OperationaiiP Networks: Methodology and Experience", In Proceedings of ACM SIGCOMM Computer Communication Review, vol. 30, No. 4, Aug. 28, 2000, 14 Pages.

Gill, et al., "Understanding Network Failures in Data Centers: Measurement, Analysis, and Implications", In Proceedings of the ACM SIGCOMM Conference, Aug. 15, 2011, pp. 350-361.

Goldernberg, et al., "Optimizing Cost And Performance For Multihoming", In Journal of ACM SIGCOMM Computer Communication Review, vol. 34, Issue 4, Aug. 30, 2004, pp. 79-92.

Hong, et al., "Achieving High Utilization With Software-Driven WAN", In Proceedings of the ACM SIGCOMM Conference on SIGCOMM, Aug. 12, 2013, pp. 15-26.

Hong, et al., "B4 and After: Managing Hierarchy, Partitioning, and Asymmetry for Availability and Scale in Google's Software-Defined WAN", In Proceedings of the Conference of the ACM Special Interest Group on Data Communication, Aug. 7, 2018, pp. 74-87.

Jain, et al., "B4: Expereince With A Globally-Deployed Software Defined WAN", In Proceedings of the ACM SIGCOMM Conference on SIGCOMM, Aug. 12, 2013, pp. 3-14.

Jalaparti, et al., "Dynamic Pricing and Traffic Engineering for Timely Inter-Datacenter Transfers", In Proceedings of The ACM SIGCOMM Conference, Aug. 22, 2016, pp. 73-86.

Jin, et al., "Toward cost-efficient content placement in media cloud: Modeling and analysis", In IEEE Transactions on Multimedia, vol. 18, Issue 5, Mar. 2, 2016, pp. 807-819.

Kandula, et al., "Calendaring for wide area networks", In Proceedings of the ACM Conference on SIGCOMM, Aug. 17, 2014, pp. 515-526.

Kumar, et al., "Bwe: Flexible, hierarchical bandwidth allocation for wan distributed computing", In Proceedings of the ACM Conference on Special Interest Group on Data Communication, Aug. 2015, pp. 1-14.

Lakhina, et al., "Diagnosing Network-Wide Traffic Anomalies", In Proceedings of the SIGCOMM Conference, Aug. 30, 2004, 12 Pages.

Liu, et al., "Approximating Optimal Spare Capacity Allocation by Successive Survivable Routing", In Proceedings IEEE INFOCOM. Conference on Computer Communications, Mar. 7, 2005, pp. 198-211.

Nagaraj, et al., "Numfabric: Fast and Flexible Bandwidth Allocation in Datacenters", In Proceedings of the ACM SIGCOMM Conference, Aug. 22, 2016, 14 Pages.

Qiu, et al., "On the placement of web server replicas", In Conference on Computer Communications. Twentieth Annual Joint Conference of the IEEE Computer and Communications Society, Apr. 22, 2001, 10 Pages.

Sahoo, et al., "A survey on replica server placement algorithms for content delivery networks", In Proceedings of IEEE Communications Surveys and Tutorials, Nov. 9, 2016, 30 Pages.

Salahuddin, "A survey on content placement algorithms for cloud-based content delivery networks", In IEEE Access, Sep. 19, 2017, pp. 1-26.

Salinas, et al., "Deepar: Probabilistic forecasting with autoregressive recurrent networks", In International Journal of Forecasting, vol. 36, Issue 3, Jul. 2020, 12 Pages.

Shaikh, et al., "A Case Study of OSPF Behavior in a Large Enterprise Network", In Proceedings of the 2nd ACM SIGCOMM Workshop on Internet Measurement, Nov. 6, 2002, 14 Pages.

Sharma, et al., "Kingfisher: Cost-aware elasticity in the cloud", In Proceedings IEEE INFOCOM, Apr. 10, 2011, 5 Pages.

Song, et al., "Dynamic provisioning with availability guarantee for differentiated services in survivable mesh networks", In IEEE Journal on Selected Areas in Communications, May 21, 2007, pp. 35-43.

Suchara, et al., "Network Architecture For Joint Failure Recovery And Traffic Engineering", In Proceedings of the ACM SIGMETRICS Joint International Conference on Measurement and Modeling of Computer Systems, Jun. 7, 2011, 12 Pages.

Taylor, et al., "Forecasting at Scale", Published by PeerJ Preprints, Sep. 27, 2017, pp. 1-25.

Tirmazi, et al., "Borg: The Next Generation", In Proceedings of the Fifteenth European Conference on Computer Systems, Apr. 15, 2020, 14 Pages.

Turner, et al., "California Fault Lines: Understanding The Causes And Impact Of Network Failures", In Proceedings of the ACM SIGCOMM Conference, Aug. 30, 2010, 12 Pages.

Uluyol, et al., "Near-Optimal latency Versus Cost Tradeoffs In Geo-distributed Storage.", In 17th USENIX Symposium on Networked Systems Design and Implementation, Feb. 2020, 24 Pages.

Verma, et al., "Large-scale cluster management at Google with Borg", In Proceedings of the Tenth European Conference on Computer Systems, Apr. 21, 2015, 18 Pages.

Verma, et al., "pMapper: Power and Migration Cost Aware Application Placement in Virtualized Systems", In Proceedings of the 9th ACM/IFIP/USENIX International Conference on Middleware, Dec. 1, 2008, 22 Pages.

Wu, et al., "Spanstore: Cost-Effective Geo-Replicated Storage Spanning Multiple Cloud Services", In the Proceedings of the Twenty-Fourth ACM Symposium on Operating Systems Principles, Nov. 3, 2013, pp. 292-308.

Zhang, et al., "Guaranteeing deadlines for inter-datacenter transfers", In Proceedings of the Tenth European Conference on Computer Systems, Apr. 21, 2015, 14 Pages.

"International Search Report and Written Opinion Issued in PCT Application No. PCT/US23/010981", Mailed Date: May 11, 2023, 14 Pages.

(56) References Cited

OTHER PUBLICATIONS

Shen, et al., "Scheduling Inter-Datacenter Video Flows for Cost Efficiency", In Journal of IEEE Transactions on Services Computing, vol. 14, Issue 3, May 2021, pp. 834-849.

Wang, et al., "A Survey on Resource Scheduling for Data Transfers in Inter-Datacenter WANs", In Journal of Computer Networks, vol. 161, Oct. 9, 2019, pp. 115-137.

* cited by examiner

OPTIMIZING NETWORK PROVISIONING THROUGH COOPERATION

BACKGROUND

The rise of cloud-scale services has fueled a huge growth in inter-data center (DC) Wide-Area Network (WAN) traffic. As a result, cloud providers provision large amounts of WAN bandwidth at very high costs. Inter-DC WAN traffic for large public cloud providers is often dominated by first-party applications and services. For example, first party search engines, productivity suites, and collaboration applications consume a significant portion of inter-DC WAN bandwidth used by the Amazon, Google, and Microsoft clouds. As such, increased first-party application usage can significantly increase inter-DC WAN traffic. To account for this increased traffic, additional DC WAN capacity is provisioned, often with a multiplicative factor to provide redundancy.

The provisioning of additional inter-DC WAN capacity has a positive feed-back effect on network bandwidth usage. The increased capacity, which is available to first party application developers at no additional cost, fuels the appetite of existing and new applications. As these applications consume more bandwidth, network capacity planning software forecasts higher network usage, which in turn leads to increased network provisioning. This cycle of increasing network usage is very expensive—inter-DC WAN bandwidth can impose an annual cost of 100s of millions of dollars on a large cloud provider.

It is with respect to these technical issues and others that the present disclosure is made.

SUMMARY

The techniques disclosed herein provision inter-DC WAN capacity based on network failure statistics and bandwidth demands of a cloud-hosted application. Network capacity is provisioned based on an assumption of runtime cooperation between the application and the network. For example, if the network detects that a link has failed, the application may cooperate with the network to pause a deferrable transfer, reserving bandwidth for non-deferrable transfers. With knowledge that deferrable transfers will be dynamically paused when a primary link fails, backup links may be provisioned with less capacity than the primary link. The ability to dynamically defer transfers also enables a greater degree of bandwidth smoothing, e.g. reducing peak demand by scheduling deferrable transfers for off-peak hours. This allows network links to be provisioned with less capacity than if all transfers were performed immediately.

A deferrable bandwidth demand includes a transfer completion deadline. Application deadlines are distinct from the more common notion of delay tolerance, which centers on the latency that the application can tolerate in network communication. Application deadlines arise from the application's ability to defer some or all of its activities, and the associated communication, for an extended period of time, e.g. when there is a loss of network capacity because of link failures. If the network capacity is likely to be restored within the period of the application deadline, then the link failure may be addressed by deferring the transfer, eliminating the need to provision redundant network capacity.

One example of deferrable bandwidth is load balancing traffic. Load balancing may be triggered when a server is running "hot" on one or more resources such as CPU, IOPS (I/O operations per second), or storage space, and therefore needs to shed load. Load balancing typically involves the transfer of a large volume of data, such as user mailboxes in the context of an email application. The load balancing activity can be paused so long as there is enough "headroom" in resources, i.e., the resource under pressure is not yet on the verge of being saturated. A deadline may be chosen for the load balancing operation to ensure that the operation completes before server saturation while still allowing flexibility over when the activity takes place.

Network bandwidth provisioning is optimized in part by simulating application demands under real-world conditions. Link failures and repairs are a common occurrence in real-world networks, and so simulated link failures and repairs are included in the simulation. One key aspect of the link failure model is the data-driven discovery of links with correlated failures. For example, multiple links may fail due to the failure of a shared component, such as fiber conduit or a power supply, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1A:
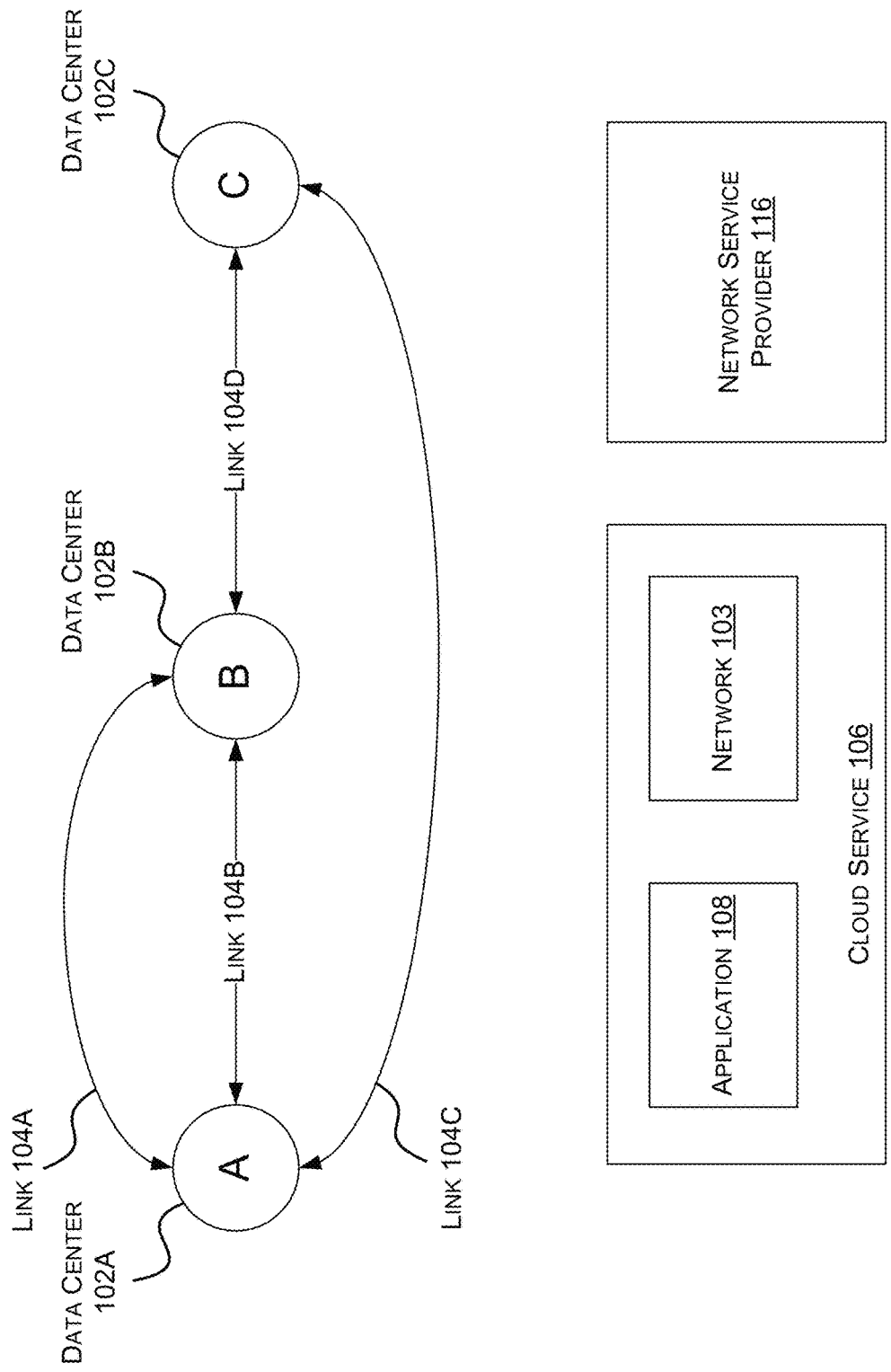
FIG. 1A illustrates a topology of an existing inter-DC WAN.

Disclosed are techniques for allocating network capacity using cooperative provisioning. Cloud operators may periodically allocate network capacity as demand fluctuates, new data centers are brought online, etc. For example, cloud operators may re-evaluate inter-DC WAN capacity every three months before leasing or building out additional network capacity. Cooperative provisioning is a technique for defining a network layout, e.g. link topography and link capacities.

Cooperative provisioning differs from traffic engineering, which focuses on supporting a specified demand on a given network. For example, traffic engineering may satisfy a source-destination flow or a quality-of-service requirement on an existing network. Traffic engineering seeks to satisfy these demands given the network's existing topology and link capacities. Both the demand matrix and the network topology are taken as input. From this input, traffic engineering looks for ways of supporting the demand at run time through techniques such as routing and path selection, smoothing to shift traffic peaks into valleys, and using store-and-forward techniques to deal with temporal offsets between traffic peaks in different parts of the network. There is a body of traffic engineering work that specifically considers the problem of satisfying deadlines in the face of new demands, link failures, etc., by employing admission control, online scheduling, and fairness across demands when the deadlines cannot be satisfied.

In comparison, cooperative provisioning involves a planning phase that precedes the creation of the network or the augmentation of its capacity. Then, while the network is operating, a real-time enforcement mechanism ensures that planned capacity limits are adhered to. Link failures are modeled upfront by simulating the failures of links and making sure that sufficient capacity is provisioned to accommodate bandwidth demands even in the face of such failures. This contrasts with traffic engineering, which deals with link failures as they arise and does not entail provisioning capacity. Traffic engineering techniques and cooperative provisioning may be complimentary techniques—e.g. a network topology defined using cooperative provisioning may be administered at runtime with traffic engineering techniques.

Cooperative provisioning enables the network to cooperate with an application to pause network traffic. The ability to pause a workload for days or weeks improves flexibility when optimizing the provisioning of network capacity. For instance, cooperative provisioning enables tiding over link failures without redundant provisioning, while traffic engineering would not.

In order for cooperative provisioning to be effective at optimizing network topology and link capacity, applications must respond to requests to pause network traffic within a reasonable amount of time. Cooperation is not always enforceable at runtime, and so cooperative provisioning requires trust between the application and the cloud it is hosted in. One opportunity to optimize provisioning by counting on the ability to pause certain demands arises with first party applications—i.e. applications that are developed by the same entity that operates the cloud they are hosted in. First party applications provide this opportunity because first party applications can be trusted to cooperate in a way that third party applications cannot. As such, cooperative provisioning is limited to settings where such cooperation is feasible. Traffic engineering, on the other hand, may be applied more broadly, e.g. to Internet Service Provider networks, and so traffic engineering techniques cannot assume cooperation.

FIG. 1A illustrates a topology of an existing inter-DC WAN, including three datacenters 102 connected by four links 104. Datacenters 102 may be components of a larger cloud service 106 that hosts application 108. Links 104 may be provisioned, e.g. leased, from one or more network service providers 116. Once provisioned, links 104 may be a part of network 103 of cloud service 106. Application 108 may be distributed in that instances of application 108 execute on servers within datacenters 102. For example, application 108 may be an email application that maintains a mailbox for each user, storing mailboxes across datacenters 102A, 102B, and 102C.

Figure 1B:
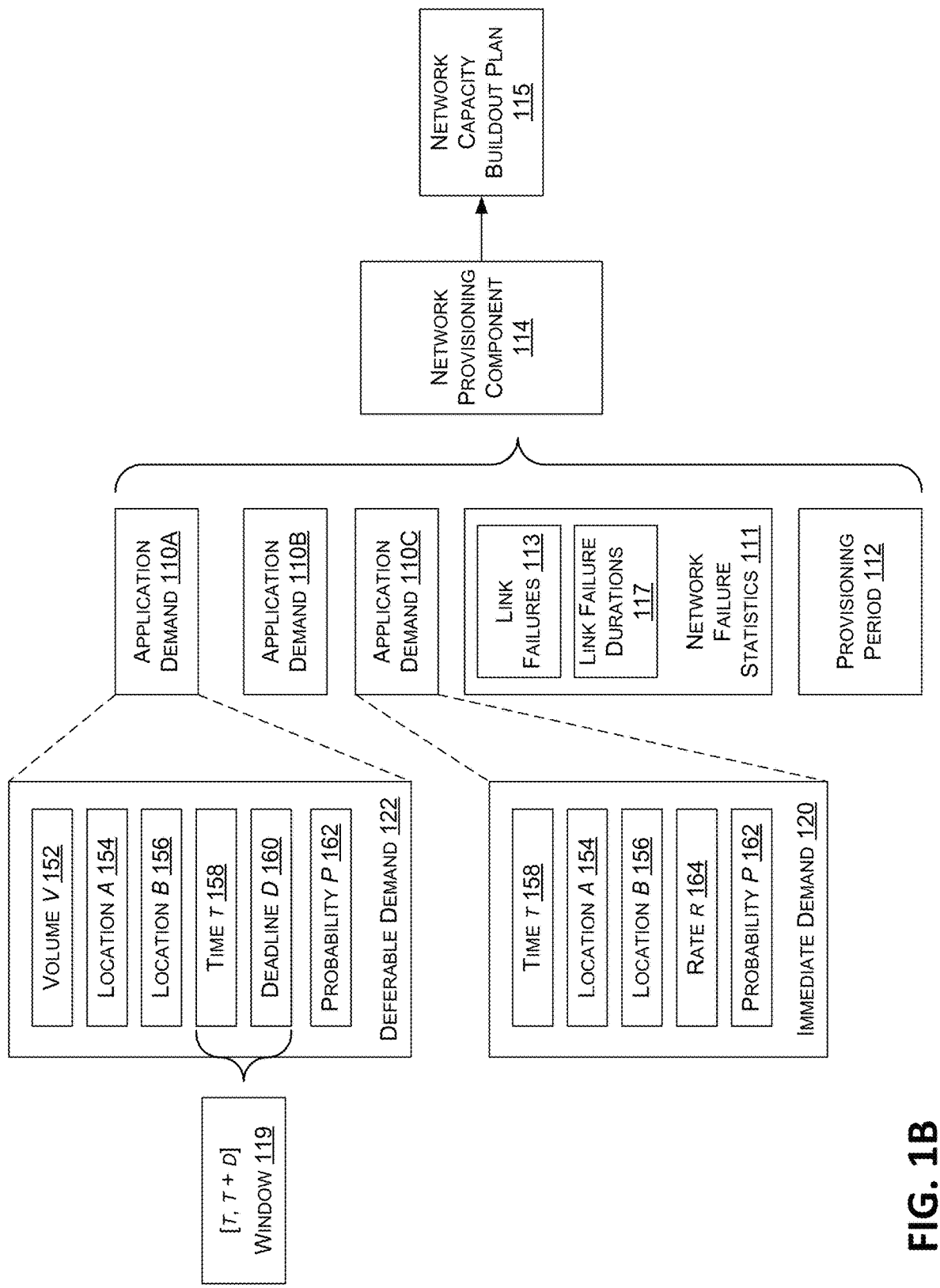
FIG. 1B illustrates an overview of usage of a network provisioning component.

FIG. 1B illustrates an overview of usage of a network provisioning component. Network provisioning component 114 may analyze application demands 110 and historical network failure statistics 111 while generating a network capacity buildout plan 115 for an upcoming provisioning period 112. Provisioning period 112 is typically a number of weeks or months, but can be as short as a few days or as long as many years. Provisioning period 112 is often chosen to be short enough that provisioning keeps up with changes in network usage. Network failure statistics 111 may include statistics about link failures 113, e.g. a list of previous times when a link 104 has failed. Network failure statistics 111 may also include statistics about link failure durations 117, i.e., the time from the loss of capacity due to the onset of a failure episode until the restoration of capacity upon repair.

Each application demand 110 details an anticipated consumption of network bandwidth for at least a portion of provisioning period 112. Network provisioning component 114 may use the information contained in application demands 110 to right-size the capacity of existing links 104—e.g. by generating a network capacity buildout plan 115 that increases or decreases the existing provisioned capacity of one or more of links 104. Network provisioning component 114 may also generate a network capacity buildout plan 115 that provisions additional links 104 or de-provisions existing links 104 according to changes in demand. In some configurations, network provisioning component 114 may query application 108 to obtain application demands 110.

Application demands 110 may be formalized as follows. An application, i, may specify its demand as a discrete time series, with $j^{th}$ demand on behalf of i being specified as:

$$D_{i,j}=(t,A,B,V,d,p)$$

Where $D_{i,j}$ represents demand for conveying a volume V 152 of traffic 153 from location A 154 to location B 156, expressed at time t 158 and with a deadline of d 160. Expressing a demand at time t with a deadline of d indicates that the demand should be satisfied during the window 119 of [t, t+d]. Probability p 162 defines a requested probability of success.

For example, Demand 110A may have parameters t=January 15th at 6 pm GMT, A=datacenter 102A, B=datacenter 102B, V=100 gigabytes (Gb), d=2 weeks, and p=0.98. As such, this demand indicates a request that at least 98% of the time, 100 Gb of data will be transferred from datacenter 102A to datacenter 102B between January 15th at 6 pm GMT and January 29th at 6 pm GMT. The demand will be considered satisfied if the transfer completes within the defined window 119—i.e. after time t and before time t+d. Network 103 may begin the transfer at any time within the defined window 119, pause or restart the transfer any number of times, and/or slow or increase the transfer speed.

Application 108, among other applications not illustrated, may provide demands 110 to network provisioning component 114. Application 108 may programmatically generate demands 110 based on an analysis of historical growth rates, new features, changing subscriber counts, and the like. Application 108 may provide demands 110 at various levels of granularity, specifying windows 113 that last seconds or less up to months or years. Application demands 110 will often attempt to anticipate usage, such as a spike due to holiday traffic or a lull due to planned maintenance.

Application 108 may also issue different types of demand forecasts. Two types of demand forecasts are immediate demand forecasts 120 and deferrable demand forecasts 122—although other types of demands are similarly contemplated. Throughout this document, immediate demand forecasts are also referred to as immediate demands, while deferrable demand forecasts are also referred to as deferrable demands. Immediate demands 120 are typically issued for traffic that is in the critical path of user latency, allowing for little temporal flexibility. The deadline for such a demand is "now". As such, immediate demand 120 can be expressed as a data rate—e.g. 1 gigabytes per second (Gbps)—to be maintained the entire provisioning period 112. For immediate demands, the formulation simplifies to:

$$D_{i,j}=(t,A,B,r,p)$$

Where the requested transfer rate r 164=V/d replaces volume V and deadline d. Note that if the network were provisioned to support the desired rate r for this demand continually, the application would be able to transfer volume V within a deadline d. Immediate demand 120 often is satisfied by provisioning an equivalent amount of bandwidth over the requested period of time it is demanded. This naïve approach to bandwidth provisioning has limited opportunities for increased efficiency in part because it is not known when peak bandwidth will be requested within the requested period of time and when small amounts of bandwidth will be requested. Without knowing when peak bandwidth will be requested, the ability to distribute bandwidth demands away from peak periods is diminished.

Deferrable demands 122 tend to be temporally flexible in that the demand is considered satisfied so long as it is completed within the defined window 119. Deferrable demands 122 may arise from asynchronous workloads, e.g. workloads that run in the background such as garbage collection, compliance checks, and workload analytics. Deferrable demands typically have a long deadline compared to immediate traffic. For example, deadline 160 may be two weeks, far longer than any timeframe considered acceptable to traffic with an immediate demand or delays introduced by traffic engineering algorithms.

One example of deferrable demand 122 is traffic arising from distributed load balancing. Distributed load balancing may be triggered by a server's resource utilization increasing above a defined threshold. For example, central processing unit (CPU), input/output operations per second (IOPS), and available storage may approach exhaustion on a server. In this situation, application 108 may rebalance the application's workload, which may entail the transfer of data used by the application among servers of different data centers 102. For example, in the context of an email service, a user's mailbox may be transferred. In the context of a storage service, a user's folder may be transferred. The urgency of the load balancing activity, and hence the deadline 160 of the resulting traffic demand 122, would depend on how much headroom there is on the server resources that are heating up.

Deferrable demand 122, as specified with a deadline d 160, reflects the degree of temporal flexibility of the traffic. For instance, in the case of a load balancing triggered workload there might be enough headroom in the server resources—i.e., none is close to being saturated—to allow d 160 to be set to days or even weeks. Note that the demand can tolerate such latency by slowing or pausing the application components responsible for the demand. Once the application component is resumed, the slowed or deferred transfers may be performed at a typical network speed, thereby completing in a much shorter and typical "network timescale", e.g., within seconds or minutes or hours, depending on the size of the transfer.

A deferrable demand 122 that has been paused must eventually be resumed by network 103 in order to complete within window 119. The amount of traffic deferred, the size of window 119, and the availability of bandwidth all are factors in determining when traffic must be resumed. In some situations, in order to meet the criteria specified in demand 110, network provisioning component 114 provisions bandwidth specifically to allow "catch-up" on the deferred demand once traffic has resumed.

Figure 2:
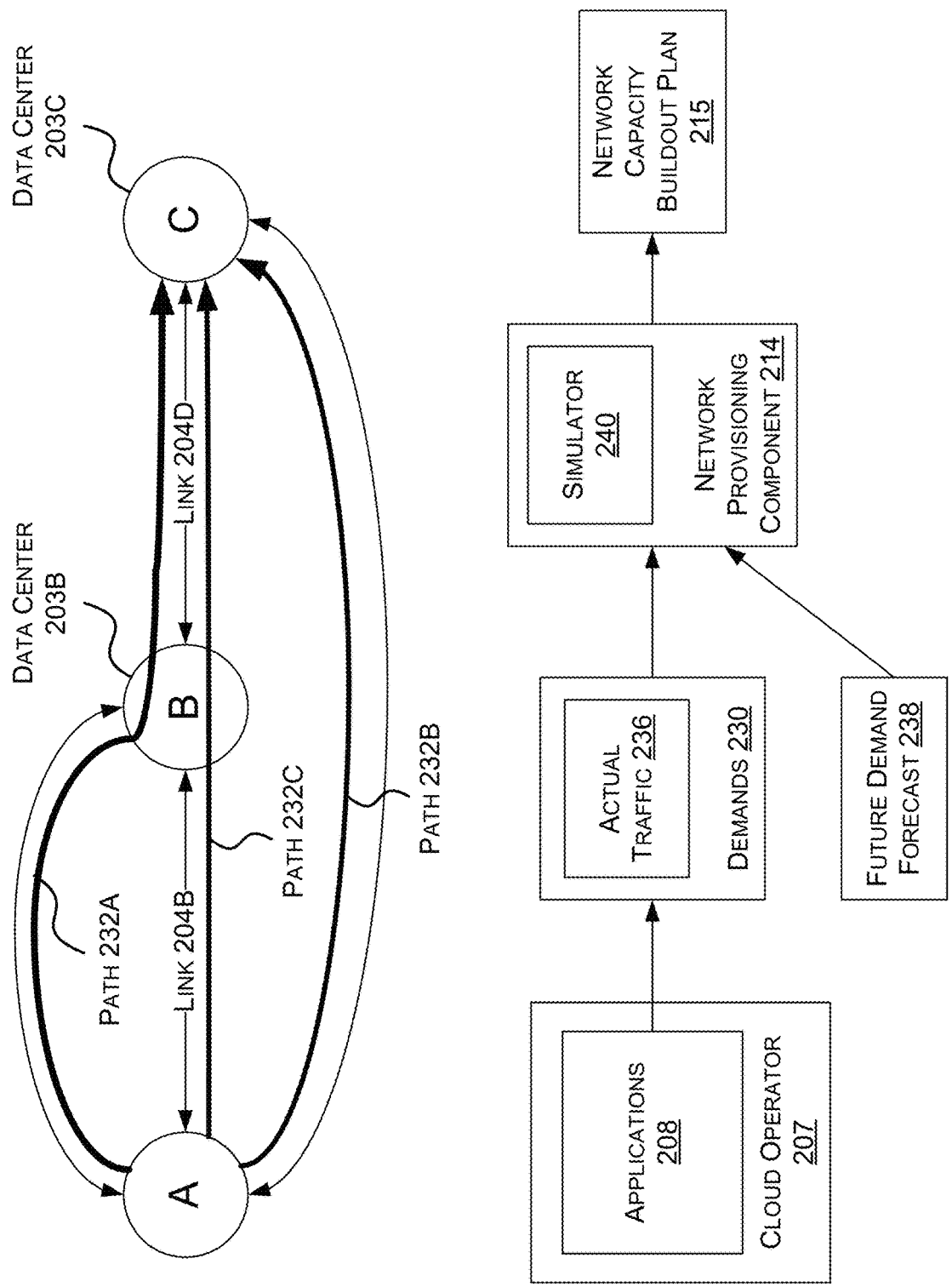
FIG. 2 illustrates existing techniques for provisioning a network. This provides contrast with the novel techniques introduced herein.

FIG. 2 illustrates existing techniques for provisioning a network. The discussion of these techniques provides contrast with the novel techniques introduced herein. One example of an existing capacity provisioning technique is employed by a commercial cloud operator 207. Periodically, e.g. every few months, cloud operator 207 forecasts demands 230 between each pair of datacenters 203. The demands 230 are forecasted by links 204 between each pair of datacenters. Specifically, link 204B connects Data Center A 203A to Data Center B 203B and link 204D connects Data Center B 203B to Data Center C 203C. Based on the forecasted demands 230, network provisioning component 214 generates network capacity buildout plan 215 with capacity to satisfy the forecasted demands 230. Since the demands 230 may arise from third-party applications 208, which the operator 206 has no meaningful leverage over, network provisioning component 214 typically provisions capacity based on a measure of actual traffic 236 that has originated from the applications 208. The measure of actual traffic 236 is an implicit signal, i.e. it is derived from the observed behavior of applications 208. An implicit signal derived from observed behaviors contrasts with the explicit expression of application traffic demands 110 discussed above in conjunction with FIG. 1. In some configurations, the measure of actual traffic 236 that has originated from applications 208 may be categorized into tiers of service, with each tier corresponding to a different priority level.

Based on this implicit demand signal derived from actual network traffic, network provisioning component 214 derives the peak traffic level and uses this to forecast the traffic level months or even years into the future. Peak traffic levels may refer to approximately peak traffic levels, such as P95, which refers to 95 percent of available bandwidth. Other percentages, e.g. P90, P50, etc., are similarly contemplated. In the absence of any additional context from the applications 208 sourcing the traffic, the operator 206 has no choice but to work with the implicit demand signal, regardless of how spiky it is—i.e. how high and how frequent the peaks are.

Network provisioning component 214 uses a simulator 240 to route each demand 230 over multiple possible paths 232 chosen based on latency, available bandwidth, and future network demand forecast 238. In some configurations, network demand forecast 238 is an extrapolation of network demand trends for one or more of applications 208, enabling demands of other applications to be reflected in network capacity buildout plan 215. Throughout this process, simulator 240 checks whether the demand would be satisfied in the face of the simulated link failures. If the demand would not be met, cloud operator 207 may augment capacity in the network (i.e., add redundant capacity) so that the demands 230 would be satisfied if the simulated failures were to actually occur. Specifically, the capacity of a link is augmented when utilization during simulation rises above a high-water mark, while the capacity is reduced when the utilization drops below a low-water mark. At the end of this iterative process of simulation, the operator 207 has obtained network capacity build out plan 215, specifying the number and capacities of the links needed.

Figure 3A:
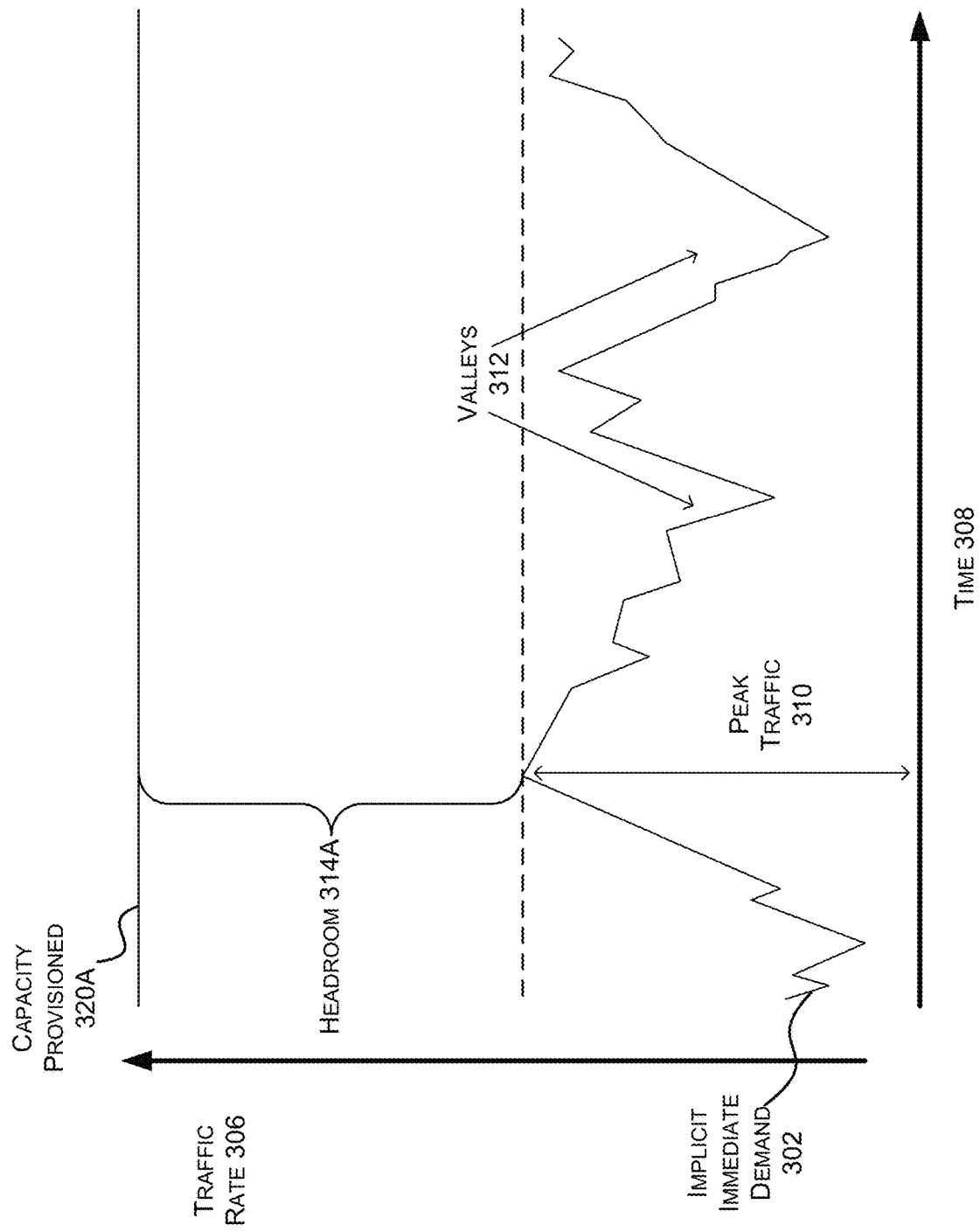
FIG. 3A illustrates implicit traffic demand derived from historical usage patterns.

FIG. 3A illustrates implicit traffic demand derived from historical usage patterns. Implicit immediate demand 302 illustrates a time series of measurements of actual traffic 236 of application 108. Traffic rate 306 is illustrated by the vertical axis, while time 308 is illustrated by the horizontal axis. Implicit immediate demand 302 graphs the traffic rate 306 over time 308, including peak traffic rate 310 and valleys 312. Capacity provisioned 320A indicates how much bandwidth existing techniques provision to accommodate the anticipated demand. Capacity provisioned 320A represents a total amount of bandwidth provisioned across multiple links 104. A primary link may be provisioned with a capacity capable of transferring peak traffic rate 310. In addition, at least one redundant link may be provisioned with the same capacity as the primary link. Procuring a redundant link with the same capacity as the primary link is one way to maintain a consistent level of service, although a significant amount of bandwidth will be unused except in failure. Headroom 314A is the amount of capacity arising from the redundant link, and so in FIG. 3A this value is approximately equal to the peak traffic rate 310.

Figure 3B:
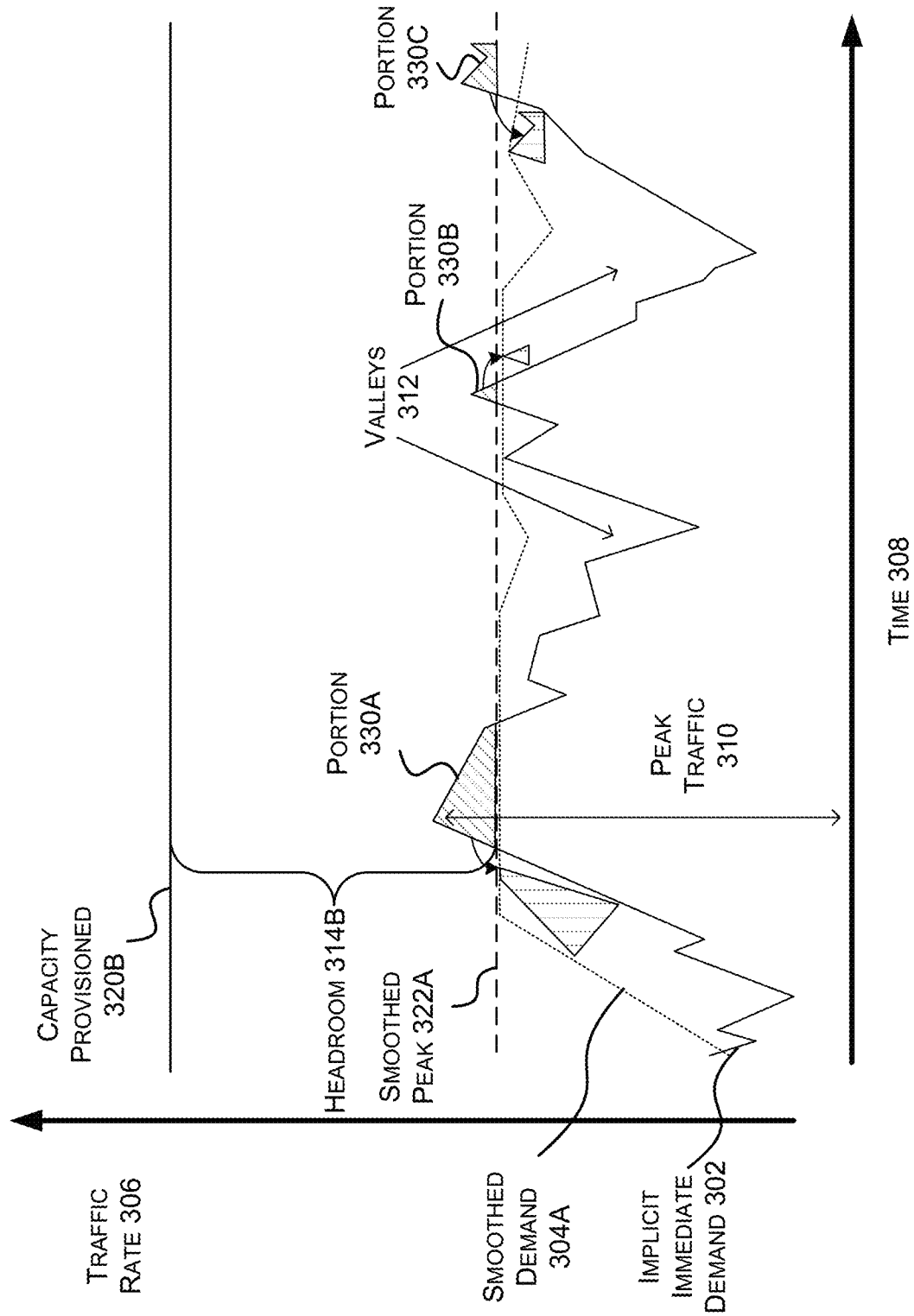
FIG. 3B illustrates a smoothed demand signal derived from explicit immediate application demands.

FIG. 3B illustrates a smoothed demand signal derived from explicit immediate application demands. Rather than just working with the implicit signal of actual traffic 236 sent, the network provisioning component 114 can take advantage of explicit application demands 110 as discussed above in conjunction with FIG. 1B. As discussed above, explicit immediate application demands 120 may be a time series of demands in the form of: $D_{i,j}$=(t, A, B, r, p), requesting a rate of traffic r between two data centers A and B starting at time t with probability p. In some configurations, explicit immediate application demands 120 also include a deadline d indicating a window of time [t, t+d] in which the demand applies.

This explicit knowledge enables network provisioning component 114 to calculate the smoothed demand 304A. For example, if the peak (or P95) rate of traffic 310 sent by application 108 was 1 Gbps, knowledge of the explicit application demand 110, including the deadline d, might allow network provisioning component 114 to determine that the application's traffic could have been smoothed down to a smoothed peak rate 322A of 0.8 Gbps. Therefore, instead of basing a bandwidth usage forecast on the 1 Gbps peak 310, network provisioning component 114 may work with the smoothed 0.8 Gbps peak 322A, thereby "right-sizing" the capacity.

As illustrated, network provisioning component 114 generates smoothed demand 304A by averaging out portions 330 of implicit immediate demand 302. In some configurations, network provisioning component 114 shifts portions 330 to adjacent points in time, as illustrated by portions 330 being shifted within smoothed demand 304A. This type of shifting is not possible without explicit application demands indicating when peak traffic may occur and that adjacent periods of time are not expected to consume all the provisioned bandwidth. Smoothed peak 322A may then be determined as the peak traffic of smoothed demand 304A. Capacity provisioned 320B illustrates a total capacity provisioned. The total capacity includes the capacities of a primary link and a redundant link, both of which are provisioned to have the capacity of smoothed peak 322A. Capacity provisioned 320B is less than capacity provisioned 320A, illustrating the improvement in efficiency by provisioning based on explicit application demands rather than just implicit traffic demands.

The shapes of portions 330 are illustrative, and do not indicate exactly how traffic is averaged out between adjacent periods of time. Furthermore, the shape of portions 330 as superimposed on smoothed demand 304A is illustrative and does not indicate how the traffic represented by portions 330 is distributed throughout smoothed demand 304A. In some scenarios, portions 330 may be averaged out with previous periods of time, later periods of time, or a combination thereof. Portions 330 may be averaged out within a single explicit immediate application demand 120 or across multiple explicit immediate application demands 120. Portions 330 may be averaged out among contiguous explicit immediate demands 120 or among explicit immediate demands 120 that are separated in time.

Figure 3C:
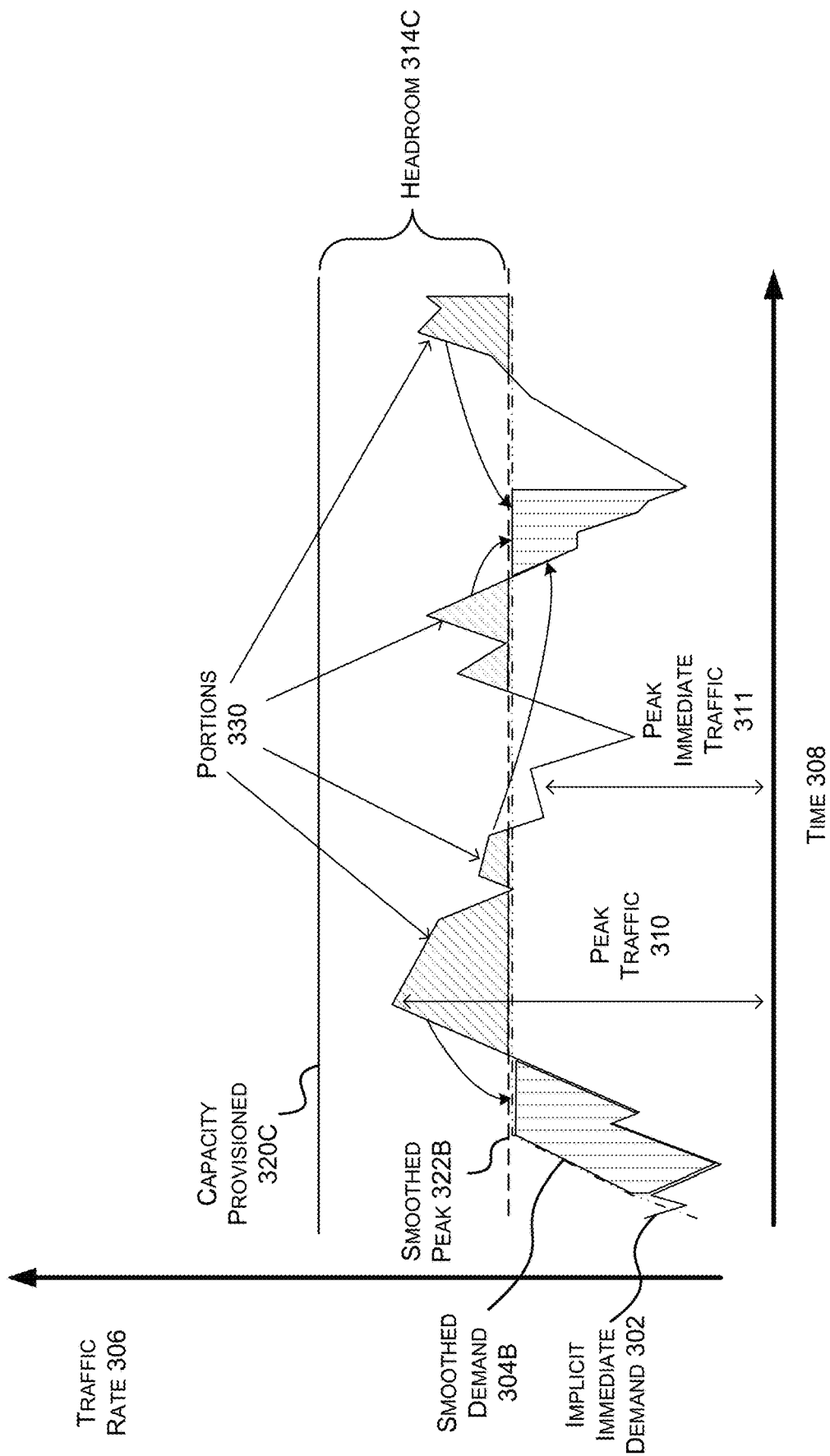
FIG. 3C illustrates a smoothed demand signal based on a mixture of explicit immediate application demands and explicit deferrable application demands.

FIG. 3C illustrates a smoothed demand signal based on a mixture of explicit immediate application demands and explicit deferrable application demands. In some configurations, application demands 110 may include a mix of "immediate" user-facing demand and "deferrable" background demand, where "immediate" demand cannot tolerate any delay. In these situations, redundant links may still be needed to process immediate demand when a primary link fails.

In some configurations, at runtime, application 108 is expected to cooperate with network 103 to pause deferrable application demands 122. By assuming that this cooperation takes place as planned, network provisioning component 114 may improve the network capacity provisioning process outlined above in FIG. 2. The reason is that much or all of deferrable demand 122 could be fit within the valleys 312 and headroom 314 of the immediate demands, obviating the need for any additional provisioning.

Specifically, by receiving a mixture of immediate demands 120 and deferrable demands 122, some amount of bandwidth—e.g. an amount sufficient to handle peak immediate traffic 311—must be provisioned on a primary link to satisfy immediate demands 120. A similar amount of capacity must also be provisioned on a redundant link to handle the immediate demands 120 in case the primary link fails. However, that deferrable demand 122 may be paused allows network 103 to schedule deferrable demands 122 within the headroom 314. This utilizes the redundant link while the primary link handles immediate demand 120. If the primary link does fail at runtime, network 103 will cooperate with application 108 to the pause deferrable demands 122 that are being transmitted over the redundant link, freeing up capacity for immediate demands 120.

Deferrable demands 122 may also be shifted within their defined window to be performed within valleys 312 of immediate demands 120. Since deferrable demands 122 may be completed any time within their window 119, which is typically larger than the latency requirement of immediate demands 120, deferrable demands 122 may be shifted further away than an explicit immediate demand 120. This increased flexibility enables more of the capacity left unused by immediate demands 120 to be utilized, increased utilization of bandwidth available on the primary link.

Figure 3D:
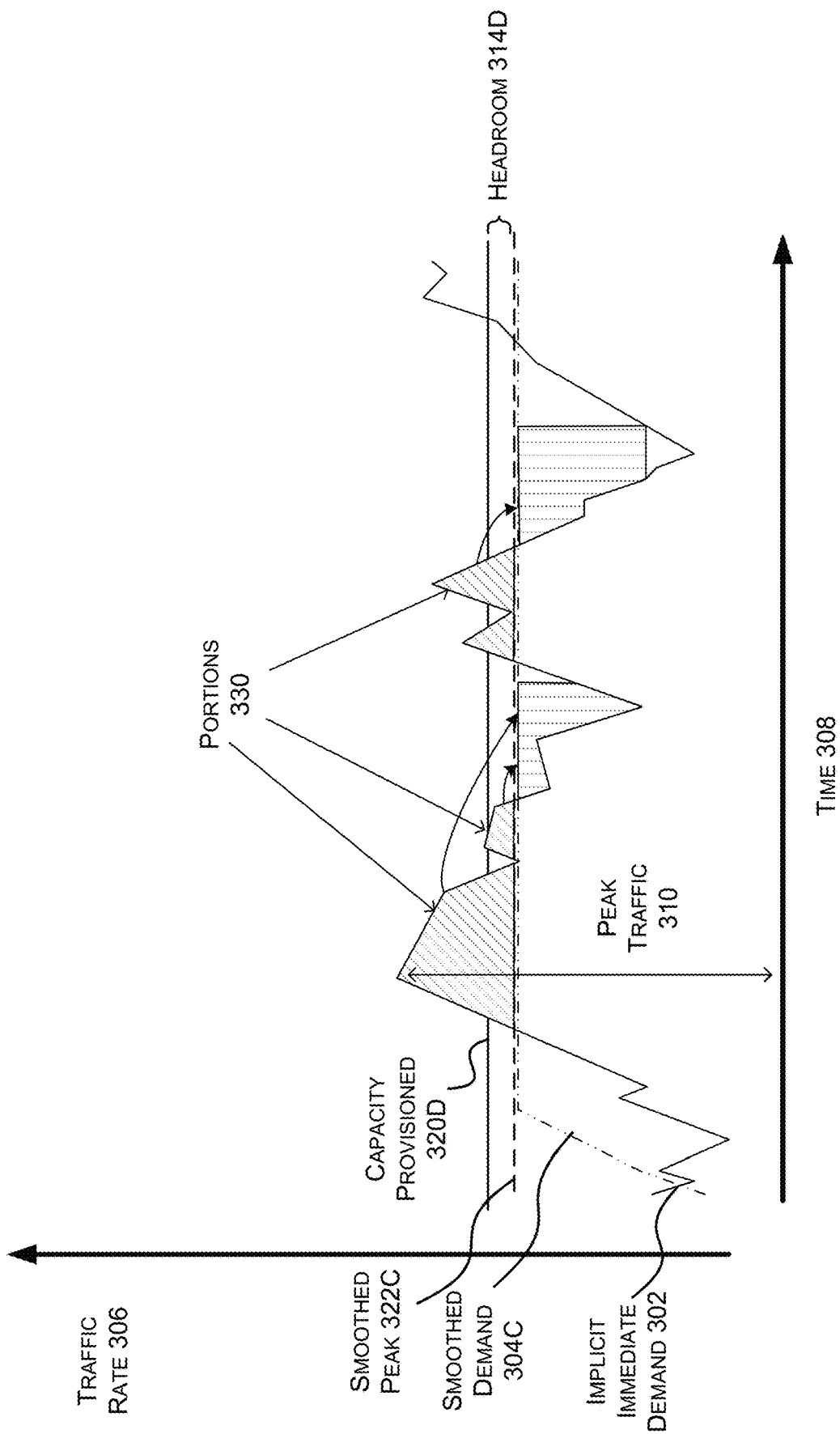
FIG. 3D illustrates a smoothed demand signal based on explicit deferrable application demands.

FIG. 3D illustrates a smoothed demand signal based on explicit deferrable application demands. In this example, all of the application demands 110 are deferrable demands 122. In this situation it is possible to avoid provisioning a redundant link. Specifically, if deferrable demands 122 have a longer deadline than the time to recovery of a link failure, then deferrable demands 122 can be paused until the failed link has been repaired. Based on an expected number of link failures and how long it takes for a link to be repaired, additional capacity may be provisioned to enable traffic to make-up for the downtime. This is discussed in more detail below in conjunction with FIG. 4, but this additional capacity is visualized as headroom 314D. As illustrated, capacity provisioned 320D is approximately equal to smoothed peak 322C plus the additional capacity to "catch up" from any downtime. No additional capacity has been provisioned on a redundant link.

FIGS. 4A-4D illustrate provisioning network redundancy in a way that is cognizant of application supplied demand deadlines and network failure statistics. The savings made possible by informed redundancy provisioning can be seen by contrasting FIG. 4B, which depicts a result of traditional provisioning techniques, with FIG. 4D, which depicts a result of techniques described herein. FIGS. 4A-4D illustrate a network comprising two nodes, 402A and 402B connected by primary link 404A and redundant link 404B. However, any number of nodes and links are similarly contemplated.

Figure 4A:
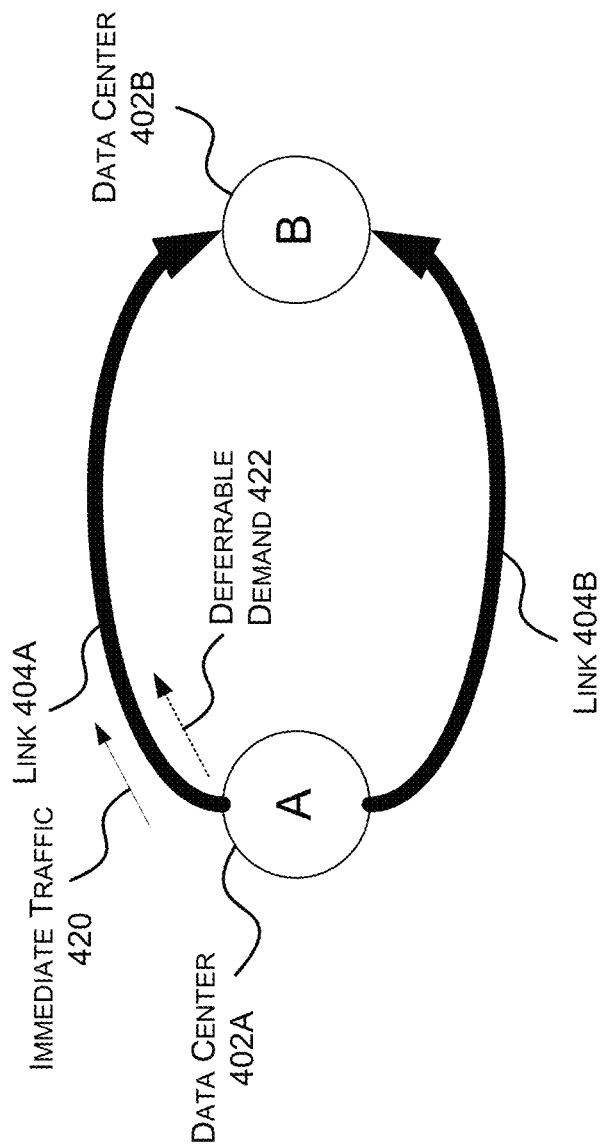
FIGS. 4A-4D illustrate provisioning network redundancy in a way that is cognizant of application supplied demand deadlines and network failure statistics.

FIG. 4A illustrates provisioning with no distinction between immediate traffic 420 and deferrable traffic 422. As such, both immediate traffic 420 and deferrable traffic 422 are transmitted on link 404A. In this way, link 404A is provisioned to handle a peak bandwidth of the combination of immediate traffic 420 and deferrable traffic 422.

Figure 4B:
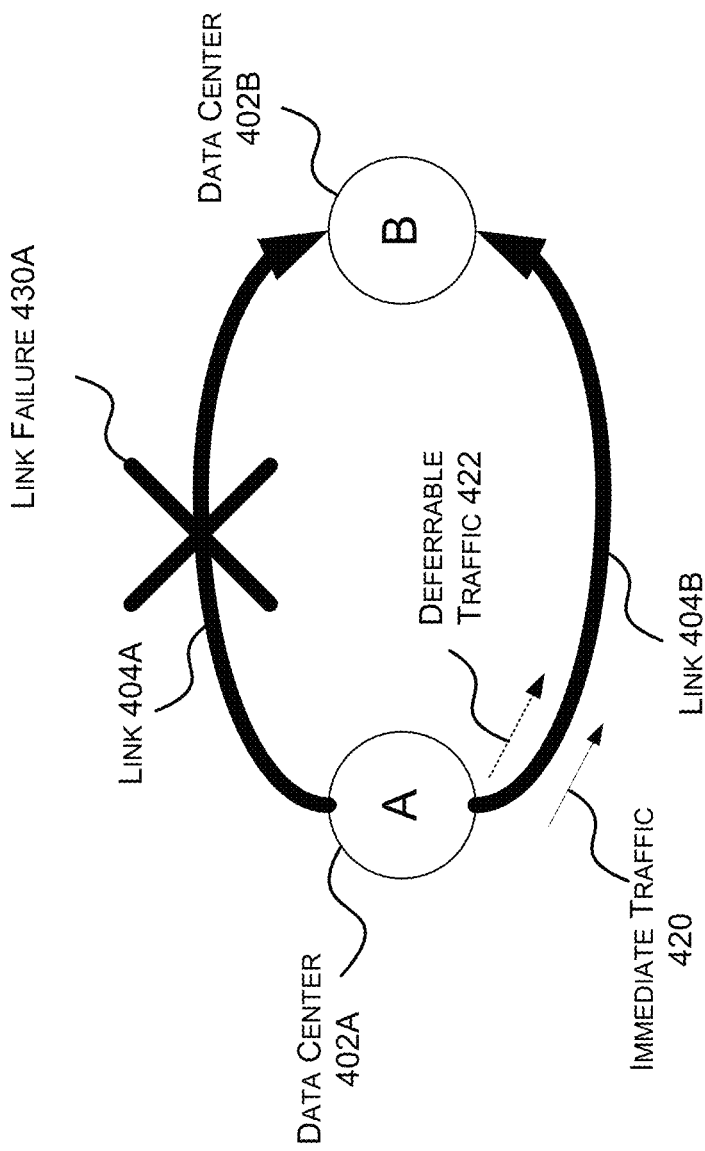

FIG. 4B illustrates a response to a failure 430A of link 404A. In this example of existing provisioning techniques, immediate traffic 420 and deferrable traffic 422 is routed over backup link 404B. Backup link 404B has the capacity to carry the full load of immediate traffic 420 and deferrable traffic 422. In some configurations, until failure 430A, the capacity of link 404B was unused and all traffic was carried by link 404A. Additionally, or alternatively, link 404B may have been used before and/or after failure 430A to balance traffic, e.g. by a traffic engineering algorithm. Throughout this document, simplified descriptions of a primary link carrying all traffic while a backup link lies idle are for illustrative purposes—real world networks tend to utilize each available link for some productive use.

For example, using existing redundancy provisioning techniques, the implicit demand of application 108 is 1 GB/day. However, the cloud operator may know that the primary link 404A between nodes 402A and 402B could be down for up to 10% of the time, i.e., for up to 3 days in the month. Therefore, to support the implicit demand using default redundancy provisioning, the network provisioning component 114 would have to provision at least one additional link of 1 GB/day capacity, and possibly more depending on the likelihood of concurrent failures of multiple links. Without this redundant capacity, the failure of the primary link 404A would cause some traffic to be delayed or even dropped for a lack of backup capacity. In total, the network provisioning component 114 would have to provision at least 1+1=2 GB/day capacity, and possibly more.

Figure 4C:
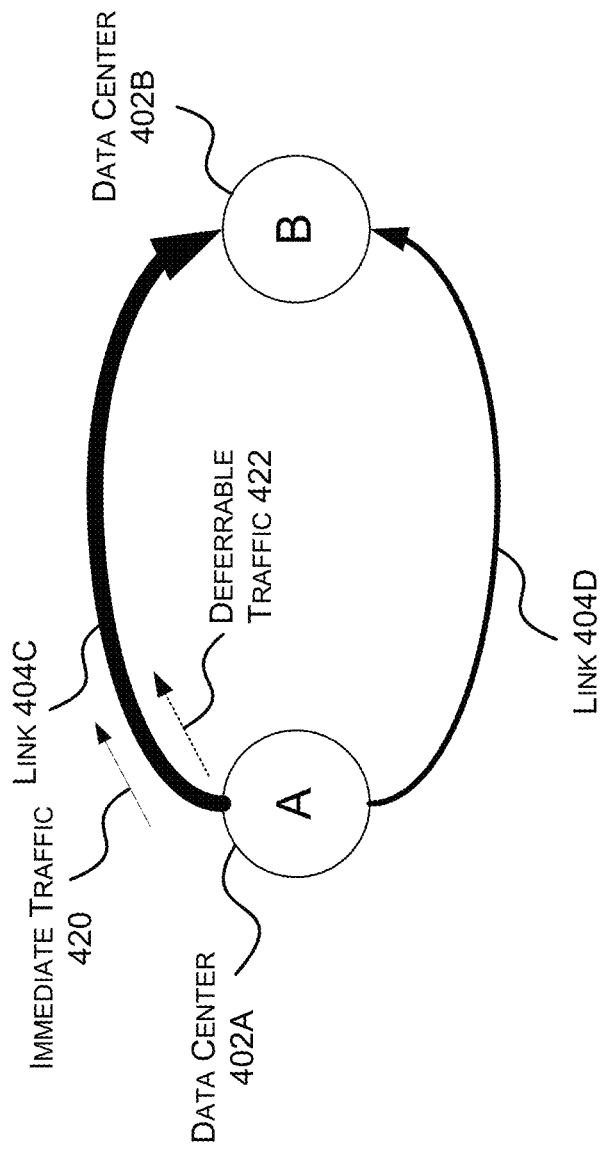

FIG. 4C illustrates cooperative redundancy provisioning. The provisioned capacity of redundant link 404D is reduced by confining its use to immediate traffic 420 in the event that primary link 404C fails. As illustrated, primary link 404C is provisioned with a slightly increased capacity compared to primary link 404A, allowing for deferrable traffic 422 to catch-up after primary link 404C is repaired. In other embodiments, redundant link 404D may be provisioned with more capacity that is necessary for immediate traffic 420 in order to allow deferrable traffic 422 to catch-up. In other embodiments, both primary link 404C and redundant link 404D are overprovisioned to allow for deferrable traffic 422 to catch-up. As discussed above in conjunction with FIG. 3C, network provisioning component 114 may allow deferrable traffic 422 to also be transmitted over redundant link 404D.

Figure 4D:
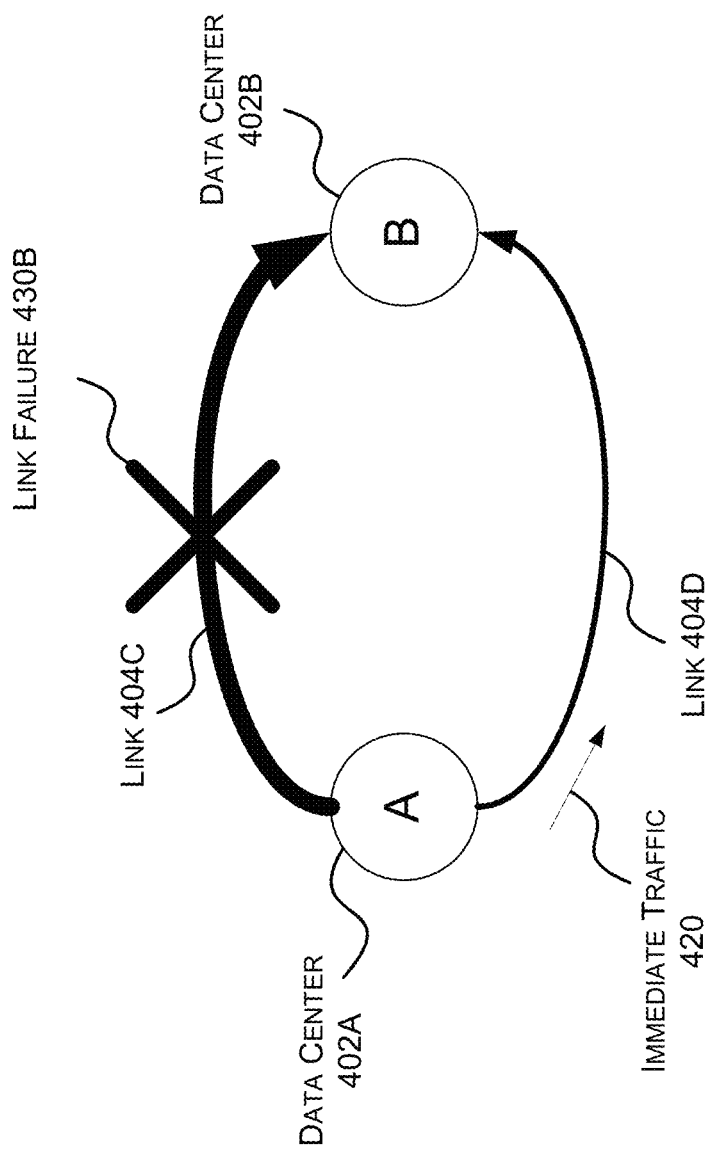

FIG. 4D illustrates a response to a failure 430B of primary link 404C. As illustrated, deferrable traffic 422 is paused, while immediate traffic 420 is shifted to redundant link 404D. For example, when using cooperative redundancy provisioning, explicit knowledge of the deadlines of immediate traffic 420 and deferrable traffic 422 would enable the network provisioning component 114 to determine that the traffic could be paused, or deferred, temporarily to "tide over" the downtime of primary link 404C. Once link 404C has been restored, there would be the need to "catch up" on the deferred traffic. Still, given the upper limit of a 10% downtime of the link, the network provisioning component 114 can get away with provisioning a single link between 402A and 402B of capacity 1.11 GB/day (computed as 1/(1−0.1)), which would be significantly lower than the 2 GB/day provisioned when using default redundancy provisioning as discussed above.

Figure 5:
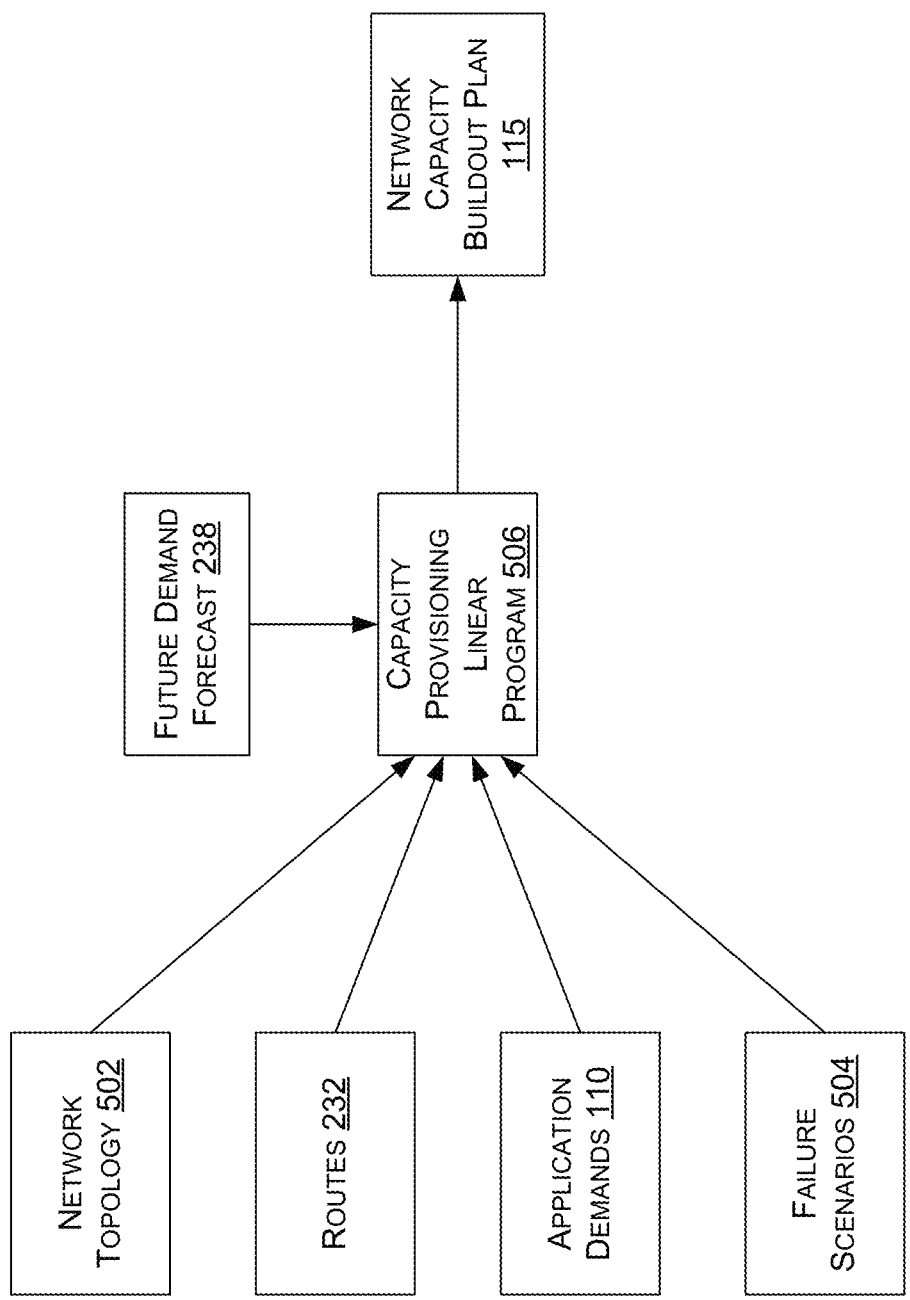
FIG. 5 illustrates a mathematical framework which, using constraint optimization, ensures appropriate provisioning of network capacity, including redundant capacity, to satisfy all demands.

FIG. 5 illustrates a mathematical framework which, using constraint optimization, ensures appropriate provisioning of network capacity, including redundant capacity, to satisfy all application demands. In some configurations, network provisioning component 114 models network provisioning as a constraint optimization problem using a linear program (LP) 506. As with any network provisioning approach, the LP 506 simulates all "likely" link failures, singly or in combination, and ensures that the network capacity buildout plan 115 has sufficient redundant capacity to fulfill all demands 110 despite such link failures. In some configurations, linear program 506 utilizes future demand forecast 508 to generate network capacity buildout plan 115. For example, growth trends in network usage may be represented by future demand forecast 238 and used to increase or decrease provisioned capacity in network capacity buildout plan 115.

A key challenge in the disclosed embodiments arises from a richer demand model compared to prior work. Previous approaches take demand data rates as input (e.g., 1 Gbps from datacenter 102A to datacenter 102B) and then simulate link failures as point-in-time events to verify the satisfaction of the demands. Since deadlines (d) 160 introduced in this document could stretch to days or even weeks, a much richer notion of failures is considered. In addition to deadlines d 160 included in explicit application demands 122, historical network failure statistics 111 such as link failures 113 and link failure durations 117 are also factors. This approach enables optimizations that are not possible with point-in-time simulation of failures.

Given a time-window $(t_s, t_e)$, a failure scenario 504 is a set of per-link time-series $\{f_1, f_2, \ldots, f_n\}$, where n is the number of links in the network. $f_l$ is a time series $f_{l1}, f_{l2}, \ldots, f_{lt}$ over the full duration of the simulation representing the status of link l, i.e., whether the link was up (working) or down (failed). In this way, link status is tracked for every link and for every time period during window $(t_s, t_e)$. The time series is discretized, e.g. in steps of 1 hour.

In some configurations, linear program 506 processes network topology 502, valid routes 232 between datacenters 102, application demands 110, and failure scenarios 504 to generate network capacity buildout plan 115. Linear program 506 has an objective function that is minimized to identify the optimal network capacity buildout plan 115. In some configurations, the objective function is the sum of the weighted augments made to each existing link 104, subject to at least three constraints: demand constraints at sources and destinations, network flow constraints at each node, and capacity constraints at each link. Weighted augments quantify changes to the provisioned capacity of existing links 104 so that the link will be provisioned with enough capacity for all deferrable demands. In some configurations there is a set of constraints corresponding to each failure scenario.

Demand constraints at sources and destinations: these constraints ensure that, for a deferrable demand, the demanded volume of traffic leaves the source node and arrives at the destination node within the deadline 160 of the demand. For example, one constraint ensures that for any deferrable demand, and for any link failure scenario 504, the total volume of traffic emerging from its source node, over all time steps within the demand's deadline, is equal to the actual demand volume V 152. This ensures that, for any predicted failure scenario, enough capacity will be provisioned that all traffic of the deferrable demand will leave the demand's source node 154 within the demand's window 119. A similar constraint ensures that, for any link failure scenario 504, the volume of traffic arriving at the destination node of a deferrable demand over all time steps is also equal to the actual demand volume V 152. This similarly ensures that, for any predicted failure scenario, enough capacity will be provisioned that all traffic of the deferrable demand will arrive at the demand's destination node 156 within the demand's window 119. In some configurations, only links that lie on a valid path 232 between source and destination nodes 102 are included in these constraints.

Network flow constraints: ensure that, for each failure scenario 504, and in each time slice, the sum of the volume coming into a node and the volume generated at that node is equal to the sum of volume going out of that node and the volume sinking into that node. This is equivalent to saying that the volume coming into a node plus the volume originating at that node should equal the volume of leaving that node plus the volume terminating at that node.

Capacity constraints at each link: This constraint ensures that, for each failure scenario 504, the total volume of traffic that a link is able to carry during a time step is greater than or equal to the sum of immediate and deferrable demands volume routed via the link during the time step. In some configurations, the total volume is computed as a product of the total capacity provisioned on that link to accommodate the immediate and deferrable demands and the uptime of the link.

For simplicity of explanation, a uniform p (i.e., probability of satisfaction) is assumed for all demands. Later, this assumption is relaxed to generalize the framework to incorporate a demand-specific p. The linear program 506 generates a network capacity buildout plan 115 in two steps: provisioning of immediate demands 120 and provisioning of deferrable demands 122.

Immediate demands: these demands have an immediate deadline, and so they are represented in terms of the rate r 164 demanded. The demanded rate 164 needs to be supported even in the face of the failure scenario 504 considered. To ensure this, network provisioning component 114 analyzes every point in time from the start to the end of the simulation, where at each point in time, a specific combination of link failures are considered. The analysis determines whether the network is sufficiently provisioned to support the immediate demands.

Deferrable demands: deferrable demands are expressed in terms of the desired volume V 162 of data to be transferred and the corresponding deadline d 160. Network provisioning component 114 may determine whether and how much of the deferrable demands 122 could be accommodated in the valleys 312 and the headroom 314 of the capacity provisioned for immediate demands 120. To the extent that the deferrable demand exceeds what can be accommodated, network provisioning component 114 augments the capacity on one or more links 104 to ensure that the deferrable demands 122 are satisfied in addition to the immediate demands 120. In doing so, the demand smoothing and redundancy rightsizing techniques discussed in FIGS. 3 and 4 may be applied.

Once immediate and deferrable demands have been accounted for, network provisioning component 114 generates a network build plan 115, which gives the capacity to be provisioned on each link 104 in the network.

As discussed above in conjunction with FIG. 1, application demand 110 may include a probability of satisfaction (p). To ensure that the capacity provisioned in the network build plan satisfies the demand with the desired probability p, a failure model generates a large number of failure scenarios 504. The generation of failure scenarios 504 is governed by the failure statistics 113 and failure durations 117 of each link 104. Consequently, the more likely link failure combinations will appear more often in the failure scenarios 504.

In order to provision the network so as to satisfy the demand with probability p, network provisioning component 114 sorts sort the |F| individual failure scenarios 504 in increasing order of the capacity of the build plan 115 generated when each such scenario alone is simulated. To enable the sorting, we consider the impact of each failure scenario 504 on the build plan capacity in isolation instead of the collective impact of a set of failure scenarios 504. Network provisioning component 114 then considers just the first probability p 162 fraction of the failure scenarios 504—i.e., the p·|F|(p <multiplied by> |F|) scenarios with the least impact on capacity—and disregard the last 1−p fraction of scenarios—i.e., the scenarios with the greatest impact on capacity. This selected subset of failure scenarios 504 is then provided as input to the capacity provisioning LP 506 to generate the build plan 115.

In some configurations, a demand-specific probability p is specified in application demands 110. In general, each demand $D_i$ could have its own $p_i$, representing the desired probability of satisfaction for that demand. To accommodate such demand-specific levels of p, network provisioning component 114 employs an iterative process:

Step 1: Sort the $p_i$ in increasing order, i.e., going from the least level of assurance sought by a demand 110 to the highest. For ease of exposition, the sorted order is assumed to be $p_1, p_2, \ldots, p_n$. Then, present all demands $(D_1, D_2, \ldots, D_n)$ to network provisioning component 114 and sort the failure scenarios 504 in increasing order of their individual impact on capacity. In some configurations, network links are grouped into collections that have a shared failure destiny, such that a failure of one link in the collection leads to a failure of all links in the collection. Link collections may arise due to utilization of a shared device, or by having certain paths in common. In some configurations, the order of a failure scenario's individual impact on capacity is based on a mean time to repair of one or more network link collections. Once the failure scenarios 504 have been sorted, pick $p_1$ as the cutoff in this sorted list of failure scenarios in order to focus on just the first $p_1$ fraction of the failure scenarios. Run network provisioning component 114 on the first $p_1$ to arrive at the cumulative capacity. This ensures that the network is provisioned to satisfy all demands with probability (at least) $p_1$.

Step 2: exclude the first demand, $D_1$, and present the rest $(D_2, \ldots, D_n)$ to network provisioning component 114 and sort the remaining failure scenarios 504 in increasing order of capacity impact—i.e. low to high. Then, pick $p_2$ as the cutoff in this sorted list of failure scenarios, and proceed as in step 1. This ensures that demands $(D_2, \ldots, Dn)$ are satisfied with probability (at least) $p_2$. Note that $D_1$ is disregarded in this step since it has already been satisfied by considering the failure scenarios in step 1 and need not be satisfied for any additional scenario considered in step 2.

Step 3: continue iterating by progressively increasing the probability of satisfaction while narrowing down the corresponding set of demands considered at each step.

Step 4: the process concludes when, in the last step, network provisioning component 114 only considers demand $D_n$ and ensures its satisfaction with probability $p_n$.

It is important to note that provisioning in each step discussed above runs cumulatively over that in the preceding steps. This ensures that the provisioning at the end of the process would satisfy all demands $D_i$ with the corresponding probability $p_i$.

Figure 6:
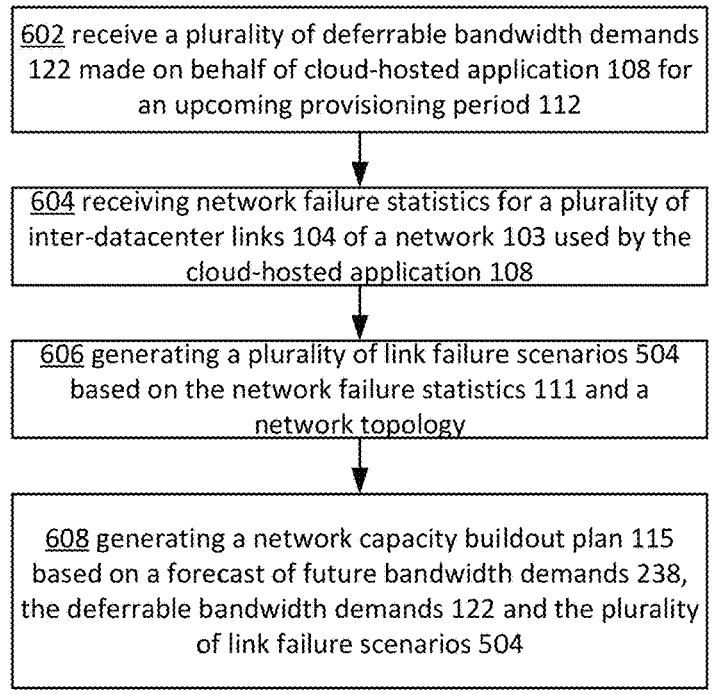
FIG. 6 is a flow diagram showing aspects of a routine for the disclosed techniques.

FIG. 6 is a flow diagram showing aspects of a routine for the disclosed techniques. Routine 600 begins at step 602, where a plurality of deferrable bandwidth demands 122 made on behalf of application 108 for an upcoming provisioning period 112 are received.

Routine 600 then proceeds to step 604, where network failure statistics 111 for a plurality of inter-data center links 104 of network 103 are received.

The routine then proceeds to step 606, a plurality of link failure scenarios 504 are generated based on the network failure statistics 111 and a network topology 502.

The routine then proceeds to step 608, where a network capacity buildout plan 115 is generated based on a forecast of future bandwidth demands 238, the deferrable bandwidth demands 122 and the plurality of link failure scenarios 504.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Although FIG. 6 refers to the components depicted in the present application, it can be appreciated that the operations of the routine 600 may be also implemented in many other ways. For example, the routine 600 may be implemented, at least in part, by a processor of another remote computer or a local circuit. In addition, one or more of the operations of the routine 500 may alternatively or additionally be implemented, at least in part, by a chipset working alone or in conjunction with other software modules.

Figure 7:
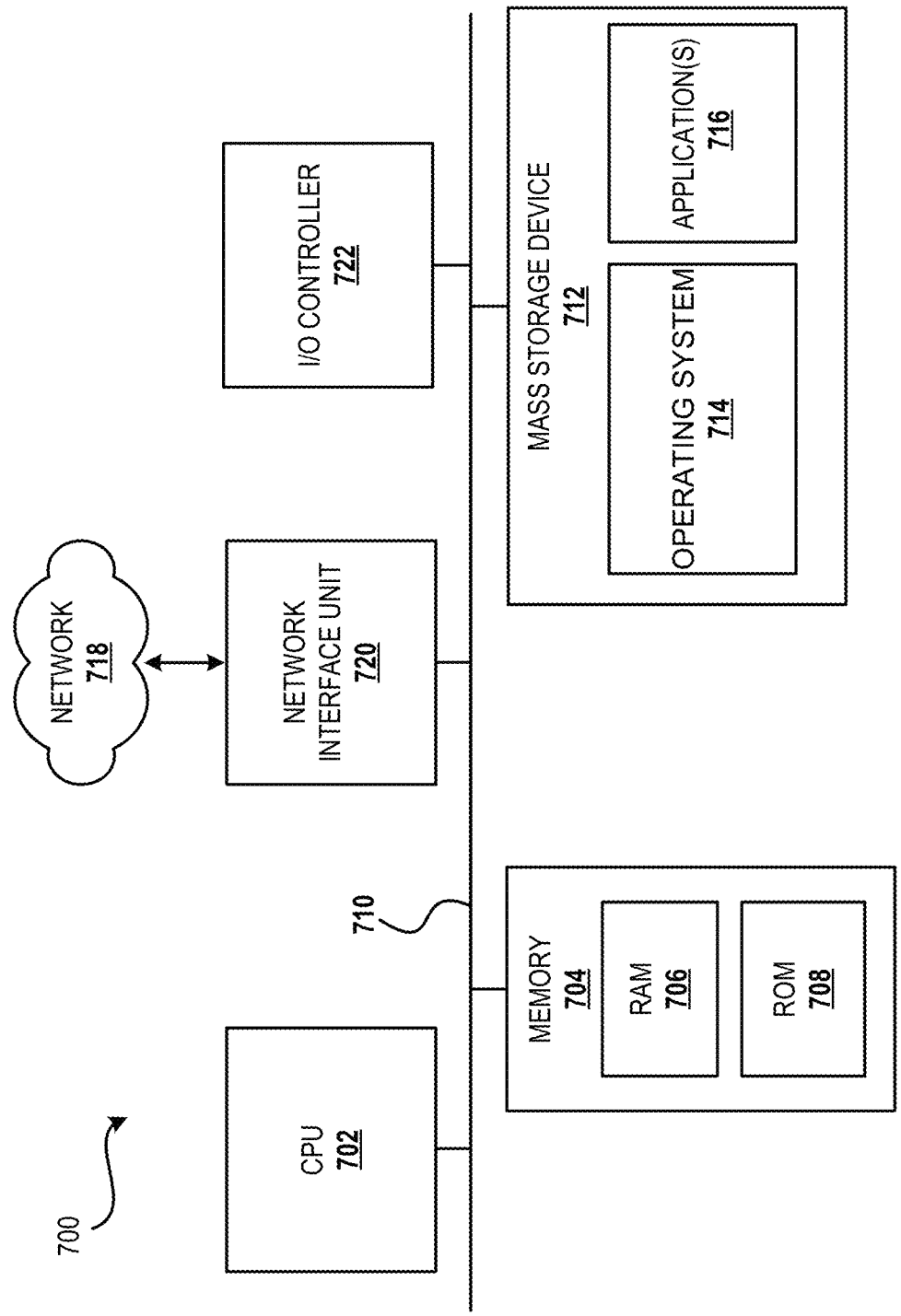
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a server within datacenter 102, capable of executing computer instructions (e.g., a module or a program component described herein). The computer architecture 700 illustrated in FIG. 7 includes processing unit(s) 702, a system memory 704, including a random-access memory 706 ("RAM") and a read-only memory ("ROM") 708, and a system bus 710 that couples the memory 704 to the processing unit(s) 702.

Processing unit(s), such as processing unit(s) 702, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716 (e.g., application 108), and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 718. The computer architecture 700 may connect to the network 718 through a network interface unit 720 connected to the bus 710. The computer architecture 700 also may include an input/output controller 722 for receiving and processing input from a number of other devices, including a keyboard, mouse, touch, or electronic stylus or pen. Similarly, the input/output controller 722 may provide output to a display screen, speaker, or other type of output device.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

The present disclosure is supplemented by the following example clauses.

Example 1: A method for cooperatively provisioning network capacity, comprising: receiving a plurality of deferrable bandwidth demand forecasts made on behalf of a cloud-hosted application for an upcoming provisioning period, wherein the cloud hosted application is distributed across a plurality of data centers that are connected by a plurality of links of a network, and wherein each of the deferrable bandwidth demand forecasts includes: a volume of traffic to transmit over the provisioning period, an identifier of a source data center, an identifier of a destination data center, a start time within the upcoming provisioning period, and a deadline within the upcoming provisioning period by which transmission of the traffic is to be completed; receiving a plurality of network failure statistics for the plurality of links; generating a plurality of link failure scenarios based on the network failure statistics; and generating a network capacity buildout plan based on the deferrable bandwidth demand forecasts and the plurality of link failure scenarios, wherein the network capacity buildout plan satisfies the deferrable bandwidth demand forecasts based on a determination that, during the provisioning period, the cloud-hosted application will cooperate with the network to pause transmission of the deferrable traffic.

Example 2: The method of Example 1, wherein the determination that the cloud-hosted application will cooperate with the network is based on a determination that the cloud-hosted application is produced by a same entity as the network.

Example 3: The method of Example 1, further comprising:
provisioning network capacity on the plurality of links for the provisioning period according to the network capacity buildout plan.

Example 4: The method of Example 1, further comprising: receiving a plurality of immediate bandwidth demand forecasts made on behalf of the cloud-hosted application for the upcoming provisioning period, wherein generating the network capacity buildout plan is further based on the plurality of immediate bandwidth demand forecasts.

Example 5: The method of Example 4, wherein at least one of the plurality of immediate bandwidth demand forecasts includes a network traffic rate, wherein the network capacity buildout plan is generated to include a primary link with enough capacity for the network traffic rate and a redundant link with enough capacity for the network traffic rate, and wherein the network capacity buildout plan is generated such that at least some of the deferrable traffic is scheduled to be performed during a valley of the plurality of immediate bandwidth demand forecasts.

Example 6: The method of Example 5, wherein the network capacity buildout plan is generated such that at least some of the deferrable traffic is scheduled to be performed during a headroom of the immediate bandwidth demand forecasts, wherein the headroom of the immediate bandwidth demand forecasts includes bandwidth provisioned in the primary link or the redundant link.

Example 7: The method of Example 1, wherein each of the deferrable bandwidth demands include individual probabilities of satisfaction, and wherein the network capacity buildout plan is generated so that each deferrable bandwidth plan has a likelihood of success equal to the corresponding probability of satisfaction.

Example 8: The method of Example 1, wherein the network is caused to pause a transfer associated with a deferrable bandwidth demand of the plurality of deferrable bandwidth demands in response to a link failure.

Example 9: The method of Example 6, wherein the plurality of network failure statistics includes a time to repair statistic of an individual link, and wherein the network capacity buildout plan is generated to include additional capacity on the individual link usable to catch-up after the deferrable transfer has been paused for the duration of the failure and then resumed after repair, wherein the additional capacity is determined based on the time to repair statistic and the volume of traffic included in the deferrable bandwidth demand forecast associated with the deferrable transfer.

Example 10: The method of Example 1, wherein the plurality of network failure statistics includes a time to repair statistic of an individual link, and wherein a window of time between the start time and the deadline of the one of the plurality of deferrable bandwidth demand forecasts is longer than the time to repair of the individual link, the method further comprising: provisioning bandwidth without a provisioning a redundant link based on a prediction of a probability of satisfying the one of the plurality of deferrable bandwidth demand forecasts with at least a desired probability of success.

Example 11: A device comprising: one or more processors; and a computer-readable storage medium having encoded thereon computer-executable instructions that cause the one or more processors to: receive a plurality of deferrable bandwidth demand forecasts and a plurality of immediate bandwidth demand forecasts made on behalf of a cloud-hosted application for an upcoming provisioning period, wherein the cloud hosted application is distributed across a plurality of data centers that are connected by a plurality of links of a network, and wherein each of the deferrable bandwidth demand forecasts includes: a volume of traffic to transmit over the provisioning period, an identifier of a source data center, an identifier of a destination data center, a start time within the upcoming provisioning period, and a deadline within the upcoming provisioning period by which transmission of the traffic is to be completed; receive a plurality of network failure statistics for the plurality of links; generate a plurality of link failure scenarios based on the network failure statistics; and generate a network capacity buildout plan based on the deferrable bandwidth demand forecasts, the immediate bandwidth demand forecasts, and the plurality of link failure scenarios, wherein the network capacity buildout plan satisfies the deferrable bandwidth demands based on a determination that, during the provisioning period, the cloud-hosted application will cooperate with the network to pause transmission of a deferrable transfers associated with the deferrable bandwidth demands.

Example 12: The device of Example 11, wherein a linear program is generated based on a topology of the network, a list of routes through the network, the immediate application demand forecasts, the deferrable application demand forecasts, and the failure scenarios, and wherein the linear program generates the network capacity buildout plan.

Example 13: The device of Example 12, wherein the linear program minimizes an objective function that sums weighted augments to each of the plurality of links.

Example 14: The device of Example 12, wherein the linear program is subject to demand constraints that ensures each deferrable traffic associated with one of the deferrable bandwidth demand forecasts leaves the source data center and arrives at the destination data center within the deadline.

Example 15: The device of Example 12, wherein the linear program is subject to network flow constraints that ensure that a first sum of a volume coming into a data center and a volume generated at the data center is equal to the a sum of volume leaving the data center and a volume sinking into the data center.

Example 16: The device of Example 12, wherein the linear program is subject to capacity constraints that ensure that, for each of the plurality of link failure scenarios, that a total volume of traffic that a link is able to transmit is greater than or equal to a sum of immediate and deferrable demand forecasts associated with that link.

Example 17: The device of Example 11, wherein each of the deferrable bandwidth demands includes a same requested probability of success, the method further comprising:

generating a network capacity buildout plan for each of the plurality of link failure scenarios in isolation; sorting the plurality of link failure scenarios in increasing order of capacity of a corresponding network capacity buildout plan; select a first percentage of link failure scenarios from a start of the sorted plurality of link failure scenarios, wherein the percentage is the requested probability of success; and provided the selected first percentage of link failure scenarios to the linear program to generate the network capacity build plan.

Example 18. A computer-readable storage medium storing instructions that, when executed by a processor, cause the processor to: receive a plurality of immediate bandwidth demand forecasts made on behalf of a cloud-hosted application for an upcoming provisioning period, wherein the cloud hosted application is distributed across a plurality of data centers that are connected by a plurality of links of a network, and wherein each of the immediate bandwidth demands includes: a rate at which to transmit traffic over the provisioning period, an identifier of a source data center, an identifier of a destination data center, and a start time within the upcoming provisioning period; receive a plurality of network failure statistics for the plurality of links; generate a plurality of link failure scenarios based on the network failure statistics; and generate a network capacity buildout plan based on the immediate bandwidth demand forecasts and the plurality of link failure scenarios, wherein the network capacity buildout plan is generated based on smoothing out peak bandwidth demands.

Example 19: The computer-readable storage medium of Example 18, wherein the network capacity buildout plan provisions a primary link and a redundant link for at least a portion of the plurality of immediate bandwidth demand forecasts, and wherein the primary link and the redundant link have a same provisioned bandwidth.

Example 20: The computer-readable storage medium of Example 18, wherein the immediate bandwidth demand forecasts comprise a time series of immediate bandwidth demand forecasts, and wherein the immediate bandwidth demand forecasts are smoothed by shifting a peak immediate bandwidth traffic associated with one of the immediate bandwidth demand forecasts to an adjacent immediate demand.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for cooperatively provisioning network capacity, comprising:
    receiving a plurality of deferrable bandwidth demand forecasts and a plurality of immediate bandwidth demand forecasts made on behalf of a cloud-hosted application, wherein:
        the cloud-hosted application is distributed across a plurality of data centers that are connected by a plurality of links of a network; and
        each deferrable bandwidth demand forecast of the plurality of deferrable bandwidth demand forecasts is tolerant to traffic delay and is considered satisfied as long as the deferrable bandwidth demand forecast is completed within a defined time window, the deferrable bandwidth demand forecast including:
            a volume of traffic to transmit during the defined time window,
            an identifier of a source data center,
            an identifier of a destination data center,
            a start time within the defined time window, and
            a deadline within the defined time window by which transmission of the traffic is to be completed;
        each immediate bandwidth demand forecast of the plurality of immediate bandwidth demand forecasts is intolerant to traffic delay and includes:
            a rate at which to transmit traffic over the defined time window,
            an identifier of a source data center,
            an identifier of a destination data center, and
            a start time within the defined time window;
    receiving a plurality of network failure statistics for the plurality of links;
    generating a plurality of link failure scenarios based on the plurality of network failure statistics; and
    generating a network capacity buildout plan based on the plurality of deferrable bandwidth demand forecasts, the plurality of immediate bandwidth demand forecasts, and the plurality of link failure scenarios, wherein the network capacity buildout plan satisfies the plurality of deferrable bandwidth demand forecasts based on a determination that, during the respective defined time windows for the plurality of deferrable bandwidth demand forecasts, the cloud-hosted application cooperates with the network to pause transmission of deferrable traffic.

2. The method of claim 1, wherein the determination that the cloud-hosted application cooperates with the network is based on a determination that the cloud-hosted application is produced by a same entity as the network.

3. The method of claim 1, further comprising provisioning network capacity on the plurality of links for the defined time window according to the network capacity buildout plan.

4. The method of claim 1, wherein the network capacity buildout plan is generated to include a primary link with enough capacity for the network traffic rate and a redundant link with enough capacity for the rate, and wherein the network capacity buildout plan is generated such that at least some of the deferrable traffic is scheduled to be performed during a valley of the plurality of immediate bandwidth demand forecasts.

5. The method of claim 4, wherein the network capacity buildout plan is generated such that at least some of the deferrable traffic is scheduled to be performed during a headroom of the plurality of immediate bandwidth demand forecasts, wherein the headroom of the plurality of immediate bandwidth demand forecasts includes bandwidth provisioned in the primary link or the redundant link.

6. The method of claim 5, wherein the plurality of network failure statistics includes a time to repair statistic of an individual link, and wherein the network capacity buildout plan is generated to include additional capacity on the individual link usable to catch-up after a deferrable transfer has been paused for a duration of a failure and then resumed after repair, wherein the additional capacity is determined based on the time to repair statistic and the volume of traffic included in the deferrable bandwidth demand forecast associated with the deferrable transfer.

7. The method of claim 1, wherein each deferrable bandwidth demand forecast of the plurality of deferrable bandwidth demand forecasts includes a probability of satisfaction, and wherein the network capacity buildout plan is generated so that the deferrable bandwidth demand forecast has a likelihood of success equal to the probability of satisfaction.

8. The method of claim 1, wherein the network is caused to pause a transfer associated with a deferrable bandwidth demand forecast of the plurality of deferrable bandwidth demand forecasts in response to a link failure.

9. The method of claim 1, wherein the plurality of network failure statistics includes a time to repair statistic of an individual link, and wherein the defined time window between the start time and the deadline of a corresponding deferrable bandwidth demand forecast is longer than the time to repair of the individual link, the method further comprising provisioning bandwidth without provisioning a redundant link based on a prediction of a probability of satisfying the corresponding deferrable bandwidth demand forecast with at least a desired probability of success.

10. A device comprising:
    one or more processors; and
    a computer-readable storage medium having encoded thereon computer-executable instructions that cause the one or more processors to:
        receive a plurality of deferrable bandwidth demand forecasts and a plurality of immediate bandwidth demand forecasts made on behalf of a cloud-hosted application, wherein:
            the cloud-hosted application is distributed across a plurality of data centers that are connected by a plurality of links of a network;
            each deferrable bandwidth demand forecast of the plurality of deferrable bandwidth demand forecasts is tolerant to traffic delay and is considered satisfied as long as the deferrable bandwidth demand forecast is completed within a defined time window, the deferrable bandwidth demand forecast including:
                a volume of traffic to transmit during the defined time window,
                an identifier of a source data center,
                an identifier of a destination data center,
                a start time within the defined time window, and a deadline within the defined time window by which transmission of the traffic is to be completed; and each immediate bandwidth demand forecast of the plurality of immediate bandwidth demand forecasts is intolerant to traffic delay and includes:
a rate at which to transmit traffic over the defined time window,
an identifier of a source data center,
an identifier of a destination data center, and
a start time within the defined time window;

receive a plurality of network failure statistics for the plurality of links;

generate a plurality of link failure scenarios based on the plurality of network failure statistics; and generate a network capacity buildout plan based on the plurality of deferrable bandwidth demand forecasts, the plurality of immediate bandwidth demand forecasts, and the plurality of link failure scenarios, wherein the network capacity buildout plan satisfies the plurality of deferrable bandwidth demands based on a determination that, during the respective defined time windows for the plurality of deferrable bandwidth demand forecasts, the cloud-hosted application cooperates with the network to pause transmission of deferrable transfers associated with the plurality of deferrable bandwidth demand forecasts.

11. The device of claim 10, wherein a linear program is generated based on a topology of the network, a list of routes through the network, the plurality of immediate bandwidth demand forecasts, the plurality of deferrable bandwidth demand forecasts, and the plurality of link failure scenarios, and wherein the linear program generates the network capacity buildout plan.

12. The device of claim 11, wherein the linear program minimizes an objective function that sums weighted augments to each of the plurality of links.

13. The device of claim 11, wherein the linear program is subject to demand constraints that ensures deferrable traffic associated with one of the plurality of deferrable bandwidth demand forecasts leaves the source data center and arrives at the destination data center within the deadline.

14. The device of claim 11, wherein the linear program is subject to network flow constraints that ensure that a first sum of a volume coming into a data center and a volume generated at the data center is equal to a sum of volume leaving the data center and a volume sinking into the data center.

15. The device of claim 11, wherein the linear program is subject to capacity constraints that ensure that, for each of the plurality of link failure scenarios, that a total volume of traffic that a link is able to transmit is greater than or equal to a sum of immediate and deferrable demand forecasts associated with that link.

16. The device of claim 11, wherein each deferrable bandwidth demand forecast of the plurality of deferrable bandwidth demand forecasts includes a same requested probability of success, the method further comprising:
generating a separate network capacity buildout plan for each of the plurality of link failure scenarios in isolation;
sorting the plurality of link failure scenarios in increasing order of capacity of a corresponding network capacity buildout plan;
selecting a first percentage of link failure scenarios from a start of the sorted plurality of link failure scenarios, wherein the percentage is the requested probability of success; and
providing the selected first percentage of link failure scenarios to the linear program to generate the network capacity build plan.

17. A computer-readable storage medium storing instructions that, when executed by a processor, cause the processor to:
receive a plurality of deferrable bandwidth demand forecasts and a plurality of immediate bandwidth demand forecasts made on behalf of a cloud-hosted application, wherein:
the cloud-hosted application is distributed across a plurality of data centers that are connected by a plurality of links of a network;
each deferrable bandwidth demand forecast of the plurality of deferrable bandwidth demand forecasts is tolerant to traffic delay and is considered satisfied as long as the deferrable bandwidth demand forecast is completed within a defined time window; and
each immediate bandwidth demand forecast of the plurality of immediate bandwidth demand forecasts is intolerant to traffic delay and includes:
a rate at which to transmit traffic over the defined time window,
an identifier of a source data center,
an identifier of a destination data center, and
a start time within the defined time window;
receive a plurality of network failure statistics for the plurality of links;
generate a plurality of link failure scenarios based on the plurality of deferrable bandwidth demand forecasts and the plurality of network failure statistics; and
generate a network capacity buildout plan based on the plurality of immediate bandwidth demand forecasts and the plurality of link failure scenarios, wherein the network capacity buildout plan is generated based on smoothing out peak bandwidth demands.

18. The computer-readable storage medium of claim 17, wherein the network capacity buildout plan provisions a primary link and a redundant link for at least a portion of the plurality of immediate bandwidth demand forecasts, and wherein the primary link and the redundant link have a same provisioned bandwidth.

19. The computer-readable storage medium of claim 17, wherein the plurality of immediate bandwidth demand forecasts comprise a time series of the plurality of immediate bandwidth demand forecasts, and wherein the plurality of immediate bandwidth demand forecasts are smoothed by shifting a peak immediate bandwidth traffic associated with one of the plurality of immediate bandwidth demand forecasts to an adjacent immediate demand.

* * * * *